US011092527B1

United States Patent
Graves et al.

(10) Patent No.: US 11,092,527 B1
(45) Date of Patent: Aug. 17, 2021

(54) HAND TOOL EDGE TESTER

(71) Applicant: Razor Edge Systems, Inc., Ely, MN (US)

(72) Inventors: Mary T. Graves, Manistique, MI (US); Daniel D. Graves, Manistique, MI (US); Joseph C. Juranitch, Babbitt, MN (US); Scott D. Taylor, San Martin, CA (US)

(73) Assignee: Razor Edge Systems, Inc., Ely, MN (US)

( * ) Notice: Subject to any disclaimer, the term of this patent is extended or adjusted under 35 U.S.C. 154(b) by 168 days.

(21) Appl. No.: 16/196,816

(22) Filed: Nov. 20, 2018

(51) Int. Cl.
*G01N 3/58* (2006.01)
*B24D 15/08* (2006.01)

(52) U.S. Cl.
CPC ............. *G01N 3/58* (2013.01); *B24D 15/081* (2013.01)

(58) Field of Classification Search
CPC .................................. G01N 3/56; G01N 3/58
See application file for complete search history.

(56) References Cited

U.S. PATENT DOCUMENTS

| | | |
|---|---|---|
| 1,780,822 A | 11/1930 | Honda |
| 2,055,125 A | 9/1936 | Floyd |
| 2,472,994 A | 6/1949 | Vars |
| 2,925,730 A | 2/1960 | Casselman |
| 3,827,281 A | 8/1974 | Hamel et al. |
| 3,942,394 A | 3/1976 | Juranitch |
| 4,934,110 A | 6/1990 | Juranitch |

(Continued)

FOREIGN PATENT DOCUMENTS

| | | | | |
|---|---|---|---|---|
| DE | 102017001589 B3 | * | 7/2018 | ............... G01N 3/58 |
| WO | 2016/080848 | | 5/2016 | |

(Continued)

*Primary Examiner* — Walter L Lindsay, Jr.
*Assistant Examiner* — Andrew V Do
(74) *Attorney, Agent, or Firm* — DeWitt LLP

(57) ABSTRACT

A hand tool edge tester for evaluating the sharpness and smoothness of the cutting edge of a blade for the hand tool like a knife is provided according to the invention. The knife blade is held stationary along a horizontal, longitudinal axis. A long piece of solid tape of the cuttable substrate material like Teflon moved within a reel-to-reel tape mechanism attached to a tape carriage travels simultaneously horizontally as the tape carriage moves along a longitudinal axis, and along an upwardly inclined, diagonal pathway defined by the reel-to-reel mechanism. The blade of the hand tool slices the upwardly, diagonally moving tape ribbon with the load cell measuring the cutting force exerted by the tape ribbon against the blade as it is moved along the distance of the cutting edge substantially between the hand tool handle and the blade tip. The diagonal axis for the path of the traveling cuttable substrate media tape allows the knife blade to cut the tape more easily without tearing, along with an approximate 90° angle between the blade tip and the cutting media pathway, thereby providing a more accurate measurement by the load cell of the tip portion of the blade as it slices the tape. The cutting force data produced by the load cell yields a cutting profile for the cutting edge along the hand tool blade to indicate the relative sharpness and smoothness of the cutting edge.

19 Claims, 11 Drawing Sheets

(56) References Cited

U.S. PATENT DOCUMENTS

| | | |
|---|---|---|
| 5,655,959 A | 8/1997 | Juranitch |
| 7,124,670 B2 | 10/2006 | Tanaka et al. |
| 7,293,451 B2 | 11/2007 | Dowd |
| 8,403,575 B2 | 3/2013 | Gocho |
| 8,758,084 B2 | 6/2014 | Knecht et al. |
| 9,016,113 B2 | 4/2015 | Newell et al. |
| 9,545,703 B1 | 1/2017 | Juranitch |
| 9,694,475 B2 | 7/2017 | Dowd et al. |

FOREIGN PATENT DOCUMENTS

| | | |
|---|---|---|
| WO | 2017/142423 | 8/2017 |
| WO | 2017/222394 | 12/2017 |

* cited by examiner

HAND TOOL EDGE TESTER

FIELD OF INVENTION

This invention relates to an apparatus for testing the sharpness and edge quality as in smoothness or roughness of the cutting or working edge of a hand tool, such as a knife blade.

BACKGROUND OF THE INVENTION

A knife represents a hand-held cutting tool with a cutting edge or blade. It may also have a handle. Originally made from rock, bone, flint, or obsidian, knife blades today are typically fashioned from iron, steel, ceramics, or titanium.

While knives may be used as a weapon, they are more commonly employed by people as useful tools in food preparation, dining, meat processing, hunting, construction, work projects, and hobbies for cutting or slicing an object. Many different types and designs of knives are known, but most of them share the trait of one or two sharpened blade edges.

But, over time, these sharpened edges of the knife blade will become dull or damaged. Blades are damaged due to compressive force arising from the user pressing the knife blade cutting edge into a hard object like bone, a hard cutting board, or other hard object, or simply by repetitive use. The knife blade may also become bent from sideways pressure applied against the blade. Both of these forces tend to roll or make blunt the knife blade's cutting edge due to the ductile characteristic of the metal material used in the blade. Moreover, tougher or abrasive materials will cause the blade to become dull more quickly.

Dull blades do not cut as easily or precisely, and can create a danger to the end user by requiring greater hand force to make a cut, thereby leading to increased worker strain, sprain, and other injuries. Moreover, such dulled blades can produce slower cutting speeds that can lead, e.g., to yield decreases in meat processing plants. Furthermore, burrs or ragged edges with out-of-alignment regions along the cutting surface of the blade can damage the material being cut, or produce an inferior cut by tearing or sawing the material being cut as opposed to a smooth, clean cut.

Therefore, such dulled knife blades must be periodically sharpened. This is typically a process in which the knife blade is manually ground against a hard, rough surface like a grinding wheel or whetstone to remove irregularities from the blade to form a new cutting edge along the blade. These sharpening stones and wheels come in varying grit degrees from very coarse to very fine, and can be described as hard or soft depending upon whether the grit comes free of the stone during the grinding operation. The cutting edges of the knife blade may also be straightened by a hand-held sharpening steel.

However, grinding constitutes a precise manual operation in which the angle of the cutting edge of the blade must match the angle of the whetstone or grinding wheel surface. Imparting a sharpened cutting edge to the dulled knife blade at the correct angle requires skill and expertise. U.S. Pat. No. 3,942,394 issued to Juranitch in 1976 for a hand-held finishing sharpener includes fold-out wings that act like sharpening steels accompanied by a handle that provides a visual guide for maintaining the proper angle of the knife's cutting edge along the wings. This may make it slightly easier for the user to estimate the proper angle for the knife blade sharpening operation.

A manually-operated knife sharpening device referred to as a MOUSETRAP STEEL sharpener that is further disclosed in U.S. Pat. Nos. 4,934,110 and 5,655,959 issued to Juranitch provides another example. It constitutes a benchtop mounted, vertical base member having a vertical slot partially bisecting the base member from its top edge. Pivotably mounted to the base member are two counterweights having equal masses. A pair of upwardly curved sharpening steels is connected to the upper and inner ends of the counterweights and extend toward each other in a crossed relationship, intersecting at and along the slot. As a knife blade is pushed down through the slot, it engages the sharpening steels at this intersection point and pushes the steels inwardly, sharpening the opposing cutting edges of the knife blade simultaneously as the knife blade is swiped along the sharpening steels. A pivotably-mounted wiper wing under the influence of its own counterweight polishes the sharpened blade. A pair of cams that are eccentrically mounted to the base member act to arrest the lateral movement of the steels during the knife sharpening operation, as well as to define the downward resting point of the counterweights when the sharpening steels are in their standby position when the knife blade is disengaged. See also U.S. Pat. No. 9,545,703 issued to Juranitch et al. and U.S. Ser. No. 15/610,169. A key advantage of this MOUSETRAP STEEL sharpener is that the criss-crossed sharpening steels act to sharpen both sides of the knife blade cutting edge simultaneously, so there is no need to swipe each side of the blade along a sharpening steel the same number of times to avoid blade damage.

Moreover, the manual sharpening of knives can be time-consuming and require skill and diligence by the end user of the sharpening device. This can be a problem in particular for industrial operations like meat processing lines where large numbers of knives are used and dulled during the course of a day. Thus, Razor Edge Systems has also commercialized a motorized "Heavy Duty System" knife blade sharpener that is used to manually restore a sharp cutting edge to a knife blade. It comprises a hollow grinder is used by the human operator to remove excess metal from the sides of the knife blade. By drawing the blade back and forth from its tip to handle between the two contra-rotating grinding wheels, the hollow grinder thins out the blade. Next, the knife is clamped by the operator into a D-ring clamping device that will provide the angle and control needed for further sharpening of the knife blade. The Edger features a rotating coarse sharpening wheel and a rotating fine sharpening wheel that are used by the operator sequentially to produce or restore the cutting edge back onto the knife blade. The coarse sharpening wheel on the Edger is used first to prepare the edge creating the correct angle. The fine sharpening wheel is then used to remove the burr created by the coarse wheel, thereby creating a sharp edge. Finally, a rotating buffer wheel removes any remaining pieces of metal from the knife blade, and smoothes the edge to remove any furrows (grooves) left behind by the Edger wheels.

Efforts have also been made to automate the knife sharpening process. But, it is not easy to replicate by a machine a process that inherently relies upon human judgment. U.S. Pat. No. 8,758,084 issued to Knecht et al. describes an apparatus for grinding hand knives comprising a CNC-operated gripper mechanism and a series of rotating, grinding, deburring, and polishing wheels. The knife is picked up by the gripper mechanism. A sensor measures the contour of the knife blade cutting edge which is then compared against stored data for the ideal profile for that knife blade. The gripper mechanism then moves the knife blade so that only those portions of the blade edge exhibiting imperfections are passed along the rotating, grinding, deburring, and polishing wheels for sharpening.

Razor Edge Systems has also developed a robotic-controlled, automated knife blade sharpening system that may be used by a relatively unskilled person to simultaneously sharpen the two opposed cutting edges of the knife blade and to maintain sharpened cutting edges along the blade with minimal effort and training, as disclosed in its pending U.S. Ser. No. 15/867,842 application. This apparatus comprises a six-axis robotic arm, a pneumatic gripper, a two-dimensional vision system with a sensor camera and software for profiling the blade edges by scanning the knife blade, a robotic controller, and sequentially-arranged grinding, coarse sharpening, fine sharpening, and buffing rotating wheel assemblies used to grind, sharpen, and buff or polish the cutting edges of the knife. The blade cutting edges are profiled by the camera image taken of the knife blade, the resulting digital image processed by associated software to produce a blade curve profile for the cutting edge between its tip and heel where the blade joins the handle, and then a filtering technique applied to applied to smooth out irregularities that may characterize the data set for the blade curve profile. The resulting corrected profile data is then translated into a set of machine control commands fed to the robotic arm and pneumatic gripper via the robot controller to cause the robotic arm to pick up the knife and properly manipulate its blade edges with respect to each of the grinding, coarse sharpening, fine sharpening, and buffing/polishing wheels in a smooth and accurate manner to apply or restore the cutting edge at the appropriate angle along substantially the entire length of the knife blade.

But, it is also important to provide a system that will test a knife blade for dullness in order to determine when it needs to be sharpened by a knife sharpening system, as well as to determine whether the blade has been sufficiently sharpened after treatment. This is particularly crucial for, e.g., a meat processing plant and other industries using many cutting blades that become dull during the course of a work shift, and where the edge sharpness and quality affect production, work quality, and employee health.

Various methods have been used in the prior art for evaluating the sharpness state of a knife blade's cutting edge. First, visual inspection of the cutting edge may reveal micro serrations or dull or folded-over spots along the blade. Regions along the cutting edge that appear to be dulling faster than other regions provides another visual clue that it is time to sharpen the knife blade.

Second, knife users can perform a "paper cut test." The knife blade is rested on the top of a vertically-oriented sheet of paper. The user slices the knife blade downwardly, preferably along the entire length of the cutting edge. If the knife blade is sharp, then the resulting cut should be produced in a clean and effortless manner. But, if the blade produces instead a torn paper entirely, then the cutting edge may be dull.

Alternatively, the user may run the knife blade cutting edge along his thumbnail. If the blade digs into the nail to create nail shavings, then this indicates that the blade is sharp. If, however, the knife blade glides effortlessly across the thumbnail without catching, then the cutting edge may need to be sharpened.

Yet another simple test constitutes a male user running the knife blade along the surface of his arm. A blade that runs above the arm while leaving all or most of the arm hairs unscathed indicates that the cutting edge is dull. Of course, these simple tests run the risk of injury to the user's hand or arm.

Devices have been known in the prior art for automating this blade edge testing process. For example, U.S. Pat. No. 2,055,125 issued to Floyd discloses a blade testing machine featuring a blade support for holding the blade with its cutting edge pointing up. A weight forces a piece of paper against the cutting edge of the knife blade under a predetermined pressure. The user pulls the paper along the length of the cutting edge, thereby cutting the paper and moving the weight in the process. The distance travelled by the weight provides a rough indication of the proportionate sharpness of the blade.

U.S. Pat. No. 1,780,822 issued to Honda shows a similar type of machine for testing and quantitatively indicating the cutting power of a sword or cutlery blade. The blade is mounted horizontally within the machine with its cutting edge against a pile of paper sheets. A weight applied to the top of the blade pushes it downwardly into the paper stack. The number of paper sheets that are cut by the blade indicates the blade's relative initial cutting power.

U.S. Pat. No. 2,472,994 issued to Vars discloses another machine in which the knife blade is secured in place by a knife clamp. A paper clamp is then released by an operator to extend a piece of paper and a balance weight is manually adjusted. A sliding and rocking motion imparted by the machine causes the knife blade cutting edge to cut edgewise into the paper sheet with the resulting depth of the cut indicative of the sharpness of the knife.

U.S. Pat. No. 2,925,730 issued to Casselman illustrates a blade edge deformation tester comprising a plurality of razor blades mounted onto a rotating turntable. They cut a paper tape multiple times. The machine is then stopped by the operator and the razor blades tested for sharpness.

U.S. Pat. No. 3,827,281 issued to Hamel shows a sheet material and knife edge abrasive test. The abrasiveness characteristic of paper is tested by pushing a cutting edge through a stack of paper sheets at constant speed. Measurement of the change in force as the cutting edge penetrates the sheet stack can be extrapolated to indicate the rate of dulling of the cutting edge by the paper sheets. But, all of these machines rely upon cutting distance as a proxy measurement for knife sharpness. This is a crude measurement for knife sharpness.

U.S. Pat. No. 7,124,670 issued to Tanaka et al. discloses a rotary cutter for a photo production operation. The machine measures the value of the electrical current required to drive the motor for the cutter. A higher current value indicates that the cutter blades have become dull, and need to be replaced.

U.S. Pat. No. 8,403,575 issued to Gocho illustrates an image recording apparatus featuring a line printer. Cutting rollers cut printed stock to a regular length. If the length of the cut stock pieces becomes irregular, then the cutter blades on the rollers are deemed to have become dull and should be replaced.

While these prior art machines extrapolate the sharpness of a knife or cutter blade as a function of an indicator like electrical current or the visual irregularity of a cut line, it would be helpful to utilize a more direct indication of blade cutting edge sharpness. Cutlery & Allied Trades Research Association ("CATRA") of Sheffield, England has commercialized a small bench-top instrument that employs cutting force measurement as a determination of knife edge sharpness. The test media is a specially-calibrated piece of silicon rubber that is either 8 mm square or with a 3 mm wide side bead silicon rubber that is bent around a 20 mm former. As a knife blade manually loaded into the instrument is pushed normally without longitudinal travel into this silicon rubber substrate, the resulting cutting force is recorded as a measure of sharpness. As the blade contacts the rubber, the force increases to a maximum value at which point the cutting starts to occur. The cutting force will then decrease. The specially-designed rubber substrate opens along the cut line, so that only the force along the cutting edge of the knife blade is recorded. The maximum force value is used as the sharpness value for the blade.

U.S. Pat. No. 9,016,113 issued to Newell et al. and owned by Wolff Industries discloses a testing device into which a pair of scissors is manually inserted. The amount of force required for the scissors blades to cut into a rubber or polymer plastic test media is used to measure the sharpness of the scissors blades.

Anago Limited of New Zealand has commercialized several devices for evaluating the sharpness of a knife blade. PCT Published Application WO 2017/222394 filed by Staub et al. discloses a cutting force analyzer comprising a weighing means adapted to determine the weight of a test product resting upon the cutting force analyzer. As the operator cuts the test product with a knife, a load cell measures the actual cutting force and compares it against a pre-programmed threshold cutting force value. The analyzer instrument provides visual or audible feedback to the operator for the sharpness of the knife blade.

Anago is also the owner of U.S. Pat. No. 7,293,451 issued to Dowd, which discloses a knife blade sharpness testing machine. This sharpness tester comprises a declined track supported by a frame. The knife blade is held by a clamp of a carriage with its blade extending horizontally. A non-cuttable substrate like wire is tensioned vertically between an anchor clamp, and a force measuring device like a load cell. As the carriage is moved downwardly within a controlled linear motion along the declined track by an electrically-powered linear actuator, the knife blade moved along the substrate. The load cell generates a signal to measure the force applied by the knife blade against the substrate along the length of the knife blade. The resulting data provides a cutting profile of the sharpness of the cutting edge of the knife blade. Thus, unlike other prior art devices, the Anago knife edge tester profiles the blade length for sharpness, instead of just the particular portion of the blade that cuts into a test substrate.

Published PCT Application WO 2017/142423 also filed by Dowd on Anago's behalf extends his concept to a testing machine in which the knife blade is oriented substantially horizontally with its cutting edge facing downwards. The blade is then moved at a downwards angle through a cuttable substrate, instead of the non-cuttable wire substrate of the '451 Dowd Patent. In this case, the cuttable substrate is held stationary under tension in a vertical alignment, and consists of a mesh strip with a plurality of independent lines spanning the width of the strip. Alternatively, the cuttable substrate consists of animal tissue. A load cell measures the cutting force applied by the knife on the cuttable substrate with the reinforcing lines in the mesh providing stability during the cutting motion. See also PCT Published Application WO 2016/080848 filed by Dowd on behalf of Anago.

However, a knife edge tester that moves the knife blade can lead to inaccurate force measurements. Moreover, the tip of the knife blade will not be measured accurately as it strikes either a strand in Anago's cuttable substrate, or the open space in the mesh material between the strands. Such a mesh material does not provide uniform resistance to the knife tip and its cutting edge across the width or length of the material. Therefore, it would be beneficial to provide a knife edge tester that holds the knife blade in a stationary position, while moving into contact with it along substantially the entire length of the blade's cutting edge a cuttable substrate material like paper or Teflon plastic film that is uniform in structure and the resistance imparted to the knife blade. Moreover, moving the cuttable substrate along multiple axes relative to the stationary knife blade would be even more desirable. Such a device would produce a reliable force-based measurement of blade edge sharpness to provide a profile of the entire cutting edge length, while being easy to operate.

SUMMARY OF THE INVENTION

A hand tool edge tester for evaluating the sharpness and smoothness of the cutting edge of a blade for the hand tool is provided according to the invention. The hand tool edge tester comprises a cabinet in which is positioned a hand tool securement station for securing a handle of the hand tool to position the blade in a stationary orientation along a horizontal longitudinal axis with a cutting edge along the blade pointing downwardly. Meanwhile, a hand tool edge testing mechanism moves a tape ribbon of a cuttable substrate against the cutting edge of the hand tool blade to measure the resulting cutting force by means of a load cell. The resulting load cell data produces a cutting profile for the cutting edge of the hand tool blade to indicate the relative sharpness and smoothness of the cutting edge.

The hand tool securement station is formed by a horizontal support plate that has a V-shaped groove running along its top surface, and an adjustable clamp comprising a guide member having a V-shaped niche. The handle of the hand tool is securely held with its bottom surface resting within the V-shaped groove of the horizontal support plate, and the V-shaped niche of the guide member tightened around the top surface of the handle. The blade of the hand tool is thereby held in a stationary position, extending along the horizontal longitudinal axis.

The tape carriage of the hand tool edge testing mechanism comprises a planar member that travels along a motorized linear actuator along the longitudinal axis. A stepper motor operated by a programmable logic control causes the tape carriage to travel along this horizontal longitudinal axis.

An idler tape reel and a drive tape reel are attached to the front face of the tape carriage. A long piece of solid tape of the cuttable substrate material travels between these two reels. A DC gear motor operates the drive reel with the tape moved along an upwardly inclined, diagonal pathway. The tape is preferably made from Teflon material, although other suitable materials like polyamide, polyethylene, polypropylene, or nylon may be used.

In operation, the tape carriage rests in its standby position with the horizontally extending blade tip penetrating the cuttable substrate tape ribbon with the tape ribbon positioned near the handle of the hand tool. The tape ribbon is moved simultaneously horizontally as the stepper motor moves the tape carriage along the longitudinal axis, and along its upwardly inclined, diagonal pathway as the DC gear motor operates the rotating drive reel of the reel-to-reel mechanism. The blade of the hand tool slices the upwardly, diagonally moving tape ribbon with the load cell measuring the cutting force exerted by the tape ribbon against the blade as it is moved along the distance of the cutting edge substantially between the hand tool handle and the blade tip. Instead of the tape ribbon moving along a vertical plane like in other prior art devices, the tape ribbon of the present invention is moved along its upwardly inclined pathway at an angle of about 0-40°, preferably 10-30°, more preferably 22.5° with respect to a vertical axis. It has been found that such a diagonal axis for the path of the traveling cuttable substrate media tape allows the hand tool blade to cut the tape more easily without tearing compared with a vertically-disposed tape travel. Moreover, hand tool blades typically curve upwardly as you approach the tip. The diagonal axis of travel for the cuttable substrate tape along the diagonal axis provides approximately a 90° angle between the blade tip and the cutting media pathway, thereby providing a more accurate measurement by the load cell of the tip portion of the blade as it slices the tape. The cutting force data produced by the load cell yields a cutting profile for the cutting edge along the hand tool blade to indicate the relative sharpness and smoothness of the cutting edge.

The hand tool edge tester of the present invention may be used to quickly and accurately evaluate the sharpness and smoothness of the cutting edge of the hand tool's blade to determine whether the blade needs to be resharpened. The hand tool may comprise, e.g., a knife, cutting blades used on automated cutting or slicing machines, scissors, scalpel, spreading device, prying device, chipping or cutting device, or stripping device.

DETAILED DESCRIPTION OF THE PREFERRED EMBODIMENT

Figure 1:
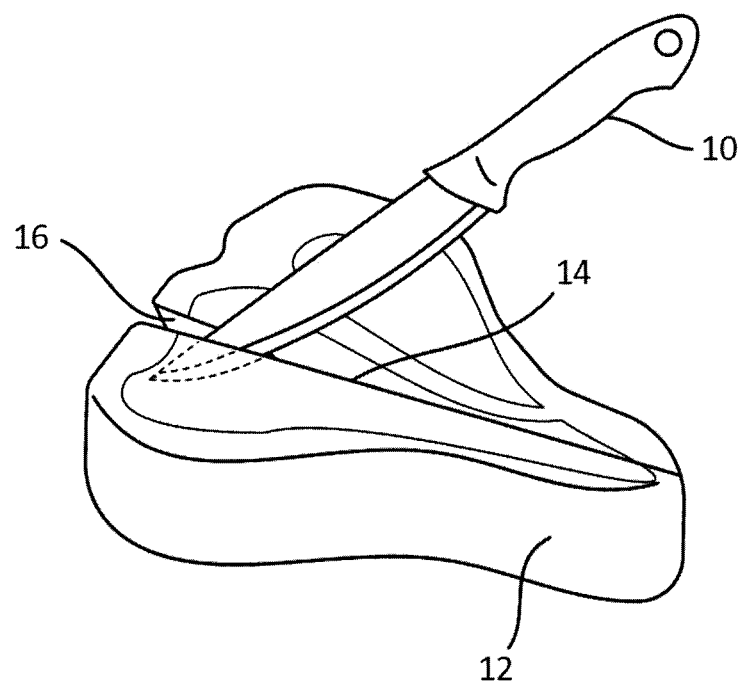
FIG. 1 is a perspective view of a knife cutting a material like a piece of meat.

A hand tool edge tester for evaluating the sharpness and smoothness of the cutting edge of a blade for the hand tool is provided according to the invention. The handle of the hand tool, such as a knife, is secured by an adjustable clamp so that the knife blade is held stationary along a horizontal, longitudinal axis. A long piece of solid tape of the cuttable substrate material like Teflon travels between an idler reel and a drive reel attached to a tape carriage. In its standby position, the horizontally extending blade tip of the knife penetrates the cuttable substrate tape ribbon with the tape ribbon positioned near the knife handle. The tape ribbon is moved simultaneously horizontally as the tape carriage moves along the longitudinal axis, and along an upwardly inclined, diagonal pathway defined by the reel-to-reel mechanism. The blade of the hand tool slices the upwardly, diagonally moving tape ribbon with the load cell measuring the cutting force exerted by the tape ribbon against the blade as it is moved along the distance of the cutting edge substantially between the hand tool handle and the blade tip. The diagonal axis for the path of the traveling cuttable substrate media tape allows the knife blade to cut the tape more easily without tearing, along with an approximate 90° angle between the blade tip and the cutting media pathway, thereby providing a more accurate measurement by the load cell of the tip portion of the blade as it slices the tape. The cutting force data produced by the load cell yields a cutting profile for the cutting edge along the hand tool blade to indicate the relative sharpness and smoothness of the cutting edge.

For purposes of the present invention, "cut substrate" means a material such as paper, cardboard, metal foil, thin plastic, textiles, cloth, silk, rope, twine, wire, wood veneers, wood, construction materials, flowers, tree or plant part, or foods like meats that is capable of being cut or trimmed by a knife.

As used within this Application, "hand tool" means a domestic, industrial, sport, or hobby implement used within a manual or automated process to produce useful work, such as a knife, cutting blades used on automated cutting or slicing machines, scissors, scalpel, spreading device, prying device, chipping or cutting device, or stripping device. As used within this Application, "knife" means a hand-operated cutting tool with a cutting edge or blade and a handle for cutting or trimming a cut substrate. It can have a fixed blade or a blade that folds or slides into a slot in the handle. It includes, without limitation, except for serrated edges, knives used as dining utensils or in food preparation like a bread knife, boning knife, carving knife, chef's knife, cleaver, butcher's knife, electric knife, kitchen knife, oyster knife, paring or coring knife, rocker knife, steak knife, table knife, or ulu; knives used as tools like a Bowie knife, cobbler's or shoemaker's knife, crooked knife, wood carving knife, diver's knife, electrician's knife, hunting knife, linoleum knife, machete, palette knife, paper knife or letter opener, pocket knife, produce knife, rigging knife, scalpel, straight razor, survival knife, switchblade, utility knife, whittling knife, x-acto knife, balisong, or kiridashi; knives used as weapons like a ballistic knife, bayonet, combat knife, dagger, fighting knife, ramuri, shiv, trench knife, butterfly knife, or throwing knife; or knives used in religious ceremonies like an athame, kirpen, kilaya, kris, kukri, puukko, seax, or sgiandubh.

FIG. 1 shows a knife 10 cutting a substrate in the form of a piece of meat 12 along an intended cut line 14. The produced cut line 16 is shown behind the travel path of the knife. While a knife has been shown as the hand tool for purposes of illustration of the hand tool wash apparatus of the present invention, it should be understood that a number of other types of hand tools may have their work surfaces cleaned, scrubbed, and sterilized by the hand tool wash apparatus, and therefore are fully covered by the scope of this invention.

Figure 2:
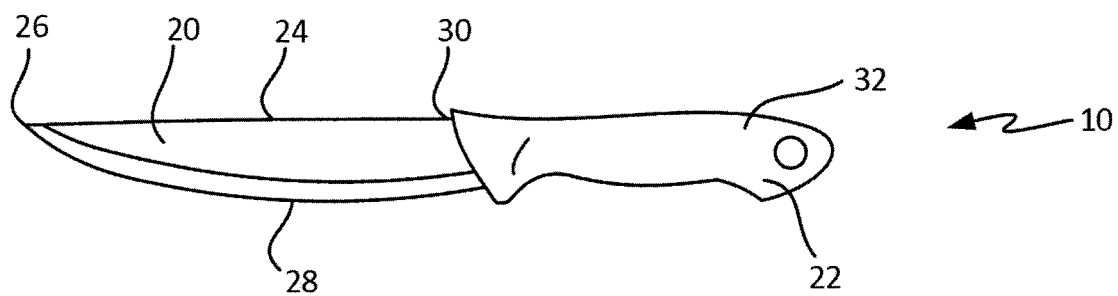
FIG. 2 is a perspective view of a knife.

The knife 10 is a hand-operated cutting tool that is shown more clearly in FIG. 2. It consists of a blade 20 and a handle 22. The blade 20 comprises a spine 24 constituting the thickest section of the blade, a point 26 located at the end of the blade, and a cutting edge 28 extending along the bottom surface of the blade from the point 26 to the heel 30. The hilt or butt 32 is formed by the end of the handle 22. The handle 22 used to grip or manipulate the blade 20 safely may include a tang constituting a portion of the blade opposite the point 26 that extends into the handle.

Figure 3:
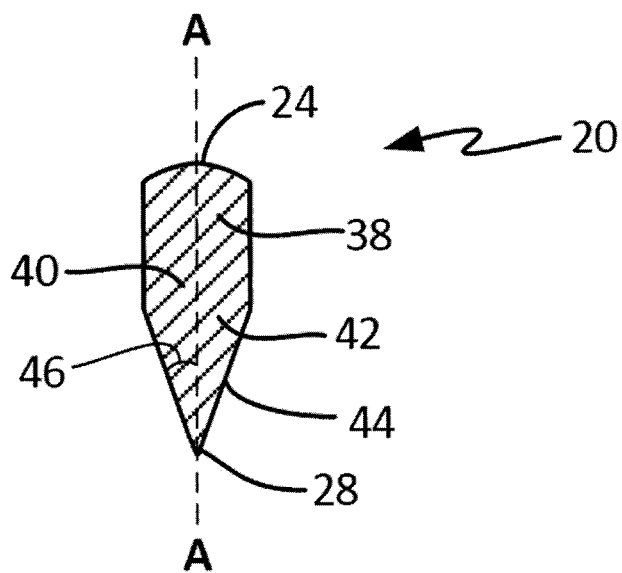
FIG. 3 is a cross-sectional view of the knife blade.

For purposes of a knife evaluated by the hand tool edge tester of this invention, the blade 20 should feature a plain cutting edge, or a plain cutting edge portion in combination with a serrated blade cutting edge portion. As shown more clearly in FIG. 3, the blade features a broad middle region 38 with the spine 24 along its top surface. The lower region 40 of the blade features a grind region 42 having a beveled edge 44 produced on one or both exterior surfaces at an edge angle 46 with respect to vertical axis A-A. This beveled edge 44 produces cutting edge 28 running along the bottom surface of the knife blade 28.

The knife blade 20 can be manufactured from a variety of different materials. Carbon steel constituting an alloy of iron and carbon can provide a very sharp cutting edge 28. It holds its edge well and is relatively easy to sharpen, but is also vulnerable to rust and stains. On the other hand, stainless steel constituting an alloy of iron, chromium, possibly nickel, and molybdenum with only a small amount of carbon will not accept quite as long lasting of a cutting edge 28 as carbon steel, but it remains highly resistant to corrosion. High-carbon stainless steel alloys contain a higher amount of carbon, and do not discolor or stain, while maintaining a sharper cutting edge. Titanium metal is characterized by a better strength-to-weight ratio. It is therefore more wear resistant and more flexible than steel. Titanium metal is often heat-treated to produce the necessary hardness required for a longer-lasting cutting edge 28 for the knife blade.

The total included angle α of the knife blade 20 extends from one side of the blade to the other side. Thus, it is double the edge angle 46 for a double-ground knife blade. Unfortunately, this included angle varies widely between different types of knives or cutting apparati. It is also influenced by the specific sharpening method, sharpening equipment, and associated manual sharpening agents used during the sharpening operation. This included angle α is about 20 degrees for razors, pairing knives, and fillet knives that constitute some of the sharpest of cutting blades. Most kitchen knives like utility/slicing knives, chef's knives, boning knives, and carving knives should have an included angle of about 30-50 degrees. Japanese-style knives feature a sharper cutting edge 28 defined by an included angle of about 28-32 degrees. Sporting knives like pocket knives, survival knives, and hunting knives usually feature an included angle of about 50-60 degrees. This shallower angle produces a broader lower region 42 having more metal material on the knife blade which produces a more durable cutting edge 28 for use in the field. Machetes, chisels, draw knives, and axes are typically sharpened to an included angle of about 60-80 degrees for even greater durability. This varying included angle makes it difficult to sharpen the cutting edges of a particular knife by prior art sharpening devices where the desired angle must be known and the device adjusted to produce that angle. Moreover, knives are not always manufactured with optimal cutting edge angles, and sharpening equipment and products often do not match the original manufactured cutting edge angle.

Figure 4:
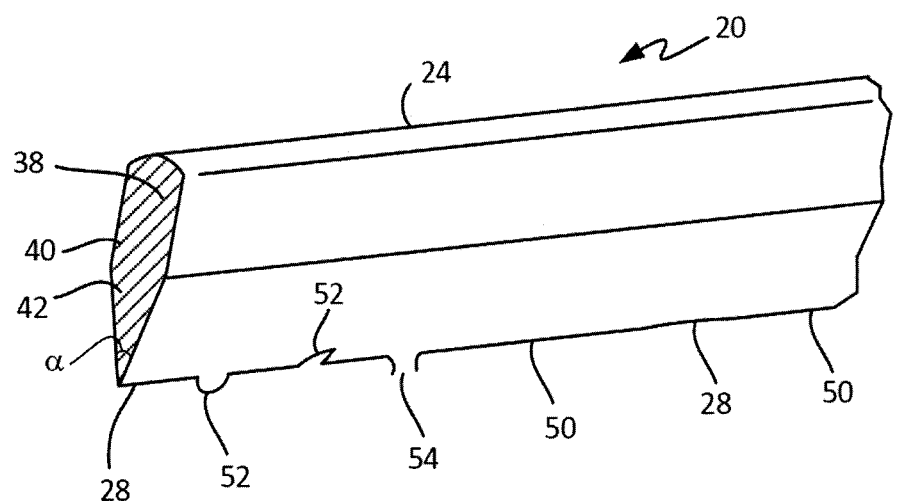
FIG. 4 is a partial perspective view of the knife blade with deformed edges and burrs along its blade.

However, cutting edge 28 along the bottom surface of the knife blade does need to be maintained in a sharpened state that accommodates its designated included angle. As shown more clearly in FIG. 4, this cutting edge should be maintained in a state with a continuous, straight edge 50 along the length of the blade. But through usage, especially if the knife 10 is used to cut or slice hard objects like bone, or construction materials, portions of this cutting edge 28 may become deformed. Such deformations within the cutting edge may create an outwardly deflected region 52 towards either side of the blade 20. Such deformations cause a "dulled edge" along the knife blade that produces a poor cut by the knife 10. Even more critically, a deformed region 52 may become worse in its deflection over time to the point that its metal separates from the knife blade 20 to form a burr 54 along the cutting edge 28. Such outwardly deflected deformations 52 or burrs 54 will require significantly greater force exerted by the user upon the knife blade 20 to cut or slice, pulling or crushing a cut substrate being cut, and thereby fail to produce a neat and uniform cut. If the knife is used to cut the stem of a flower or plant, these deformations and burrs can crush the edge of the stem to make the flower or plant susceptible to disease or shorten its life.

While a piece of meat 12 has been shown as the piece of cut material cut by the knife 10 for the sake of illustration, a number of other types of cut materials that can be cut or sliced by a knife like skin, plastic, textiles, paper, film, and hobby or construction materials are possible, and should be understood as being fully covered by the scope of this invention.

Moreover, while a knife is shown for illustration purposes as the hand tool that is evaluated by the edge tester device of the invention, it is important to understand that a variety of other types of hand tools may likewise be evaluated for sharpness and edge quality of their cutting edges using the edge tester device.

The hand tool edge tester 60 of the present invention is shown in FIGS. 5-11. It comprises a cabinet 62 formed from end panels 64 and 66, top panel 68, slanted front panel 70, and bottom panel 72 (not shown). A vertical subpanel 74 positioned inside the chamber 76 of the cabinet 62 formed by the other panels divides the chamber into an open front subchamber 76 (in combination with horizontal subpanel 80) and an open rear subchamber 78. Slanted front panel 70 is attached to the cabinet 62 by means of hinge 82 so that it may be opened to provide access to an upper chamber 84. Supporting frame members (not shown) may be used to secure these various panels with respect to each other to form the cabinet and subchambers.

Figure 5:
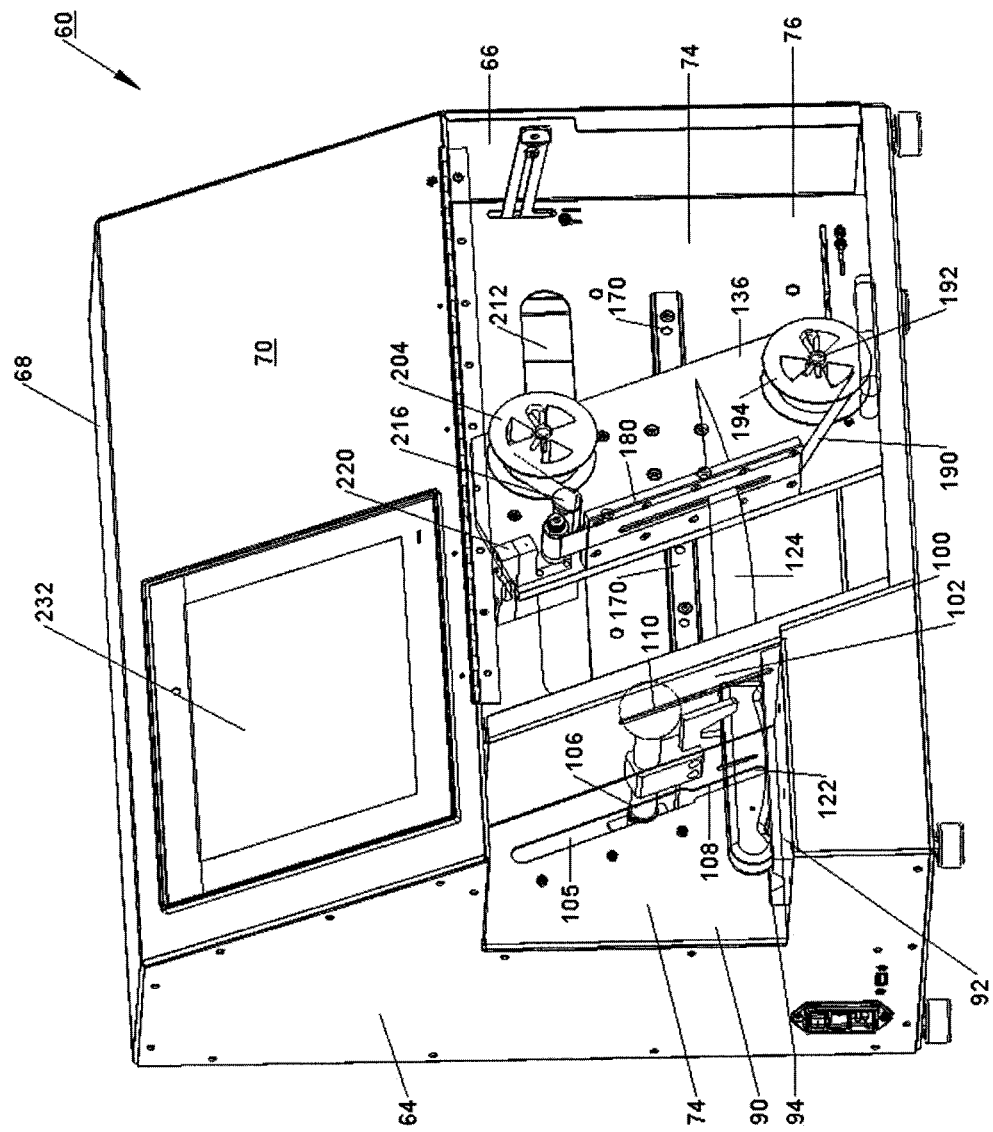
FIG. 5 is a frontal perspective view of the hand tool edge tester device of the present invention.

Positioned within the left-side region of front subchamber 76 is hand tool securement station 90. This station is formed by horizontal support plate 92 that has a groove 94 running along its top face 96. The groove shown in FIG. 5 is V-shaped, but any other shape that is suitable for holding the bottom surface of the handle of the hand tool may be employed. A slanted abutment wall 100 is attached to the right end of support plate 92. It has a slot 102 formed within it.

Figure 6:
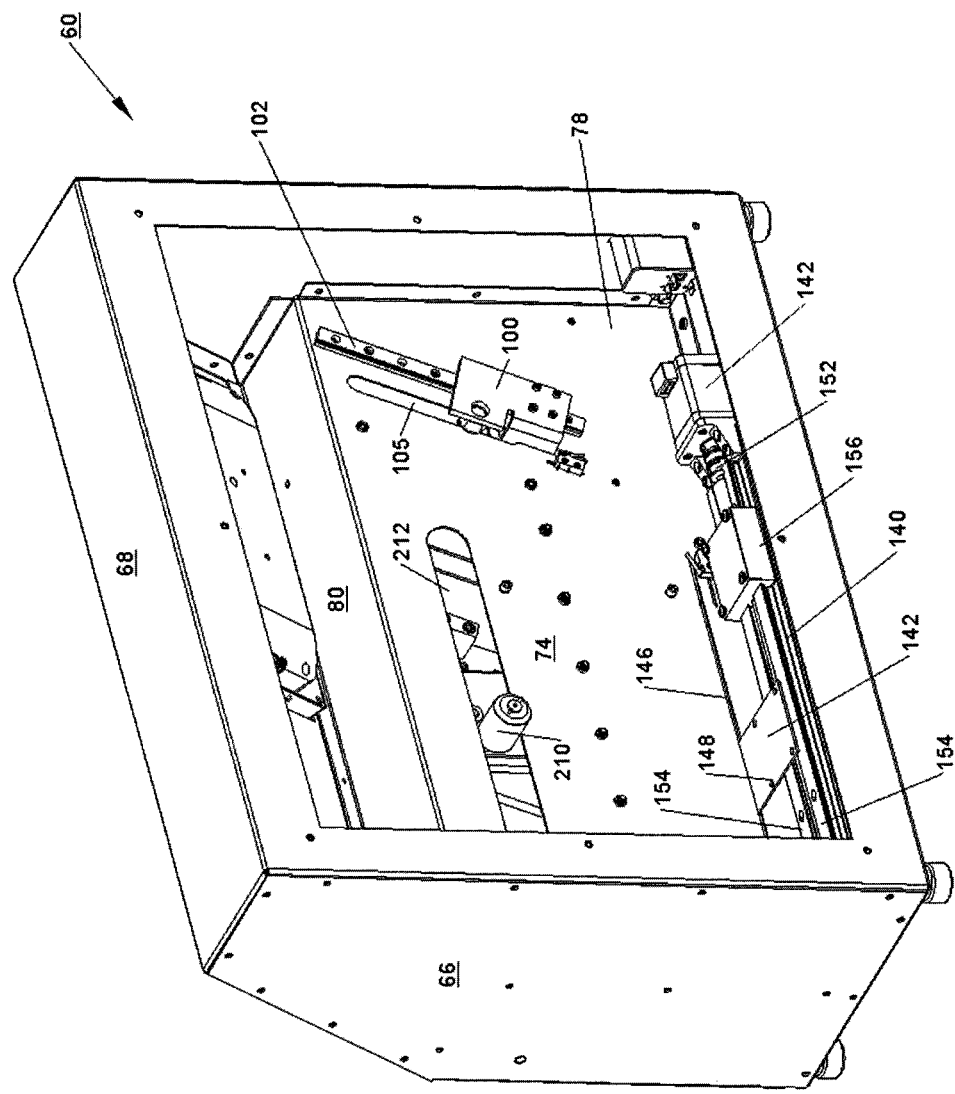
FIG. 6 is a rear perspective view of the hand tool edge tester device of FIG. 5.

Hand tool securement station 90 also comprises clamp 98, as shown in FIGS. 5-6. The clamp comprises a guide member 100 that slides along rail 102 secured to the rear surface of vertical subpanel 74 inside rear subchamber 78. A shaft 104 extends forwardly from guide member 100 through guide slot 105. Inside front subchamber 76, spacer 106 and clamp member 108 are slidably positioned along shaft 104. Knob 110 is threadably secured to the front end of shaft 104 (not shown). As knob 110 is turned in a clockwise direction around shaft 104, it rotates along the threads formed around the shaft end to move towards subpanel 74 until clamp member 108 and spacer 106 are securely held in place along the shaft between the knob and subpanel. Formed along the bottom edge of clamp member 108 is a V-shaped niche 114.

The knife 120 shown in FIGS. 5-6 comprises a handle 122 and a blade 124. The knife is placed by the operator of the hand tool edge tester 70 so that the bottom surface of handle 122 rests within V-shaped groove 94 of support plate 92, and the interior end 126 of handle 122 that joins the butt of blade 124 abuts slanted abutment wall 100 with the knife blade 124 passing through slot 102. Meanwhile, V-shaped niche 114 formed within clamp member 108 envelops the upper portion of knife handle 122. This combination of the support plate 92, slanted abutment wall 100, and the clamp member 108 tightened by knob 110 cooperate to hold the knife handle in a stationary position with its blade 124 extending along a horizontal longitudinal axis B-B.

The right-hand region 130 of front subchamber 76 contains hand tool edge testing mechanism 132. It comprises a tape carriage 136 that is shown in greater detail in FIGS. 8-11.

Figure 11:
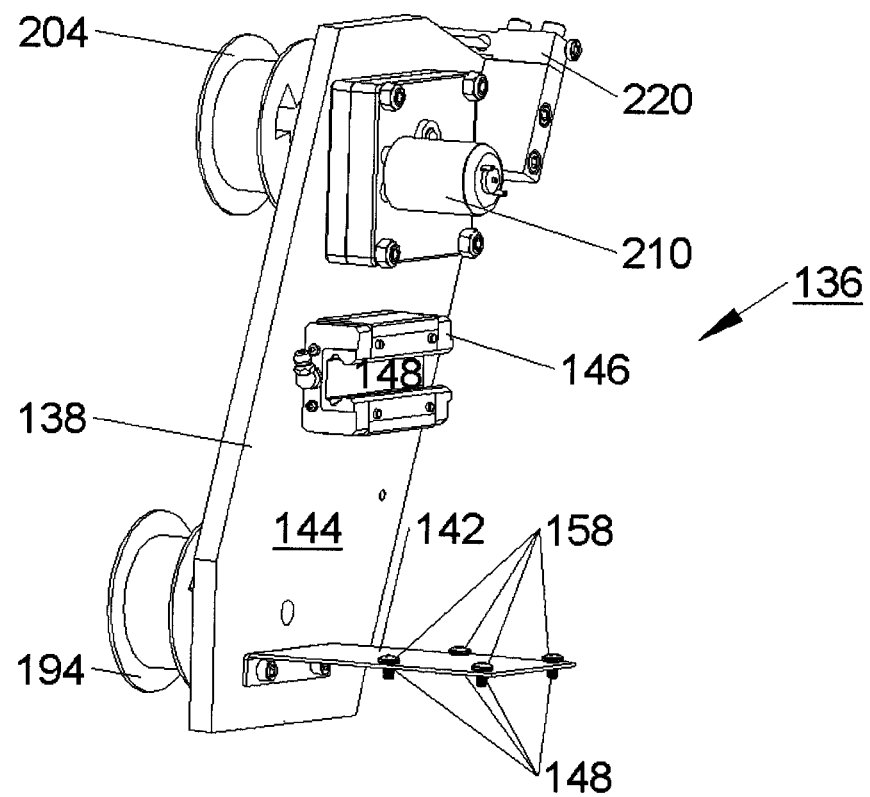
FIG. 11 is a rear frontal perspective view of the tape carriage assembly.

Tape carriage 136 comprises a planar member 138 that travels along a motorized linear actuator 140 along the longitudinal axis B-B. As shown in FIG. 11, support bracket plate 142 is connected to and extends horizontally from the rear face 144 of planar member 138. The support bracket plate 142 passes through slot 146 formed in vertical subpanel 74 so that while one end of planar member 138 is positioned in front subchamber 76, the other end of the support bracket plate 142 is in rear subchamber 78. A plurality of holes 148 are formed this send portion of the support bracket plate.

Also connected to the rear face 144 of the planar member 138 is guide slider 146. This guide slider bears a C-shaped cross-sectional profile, defining an open-faced interior region 148.

Motorized linear actuator 140 is positioned along the bottom of rear subchamber 78. It comprises a stepper motor 150 that operates a helically-threaded rod (screw) 152 by rotating it in a clockwise or counter clockwise direction. Two rails 154 extend from the motor housing with the screw 152 positioned therebetween. A traveling carriage 156 is guided along the rails 154 in a linear direction to the left as the screw is turned by the motor in a clockwise direction, and to the right as the screw is turned in a counterclockwise direction. The end portion of the support bracket plate 142 is attached to the top surface of the traveling carriage 156 of the motorized linear actuator 140 by means of a plurality of bolts 158 that pass through holes 148 in the support bracket plate into engagement with corresponding treaded apertures 160 formed in the traveling block. In this manner, the tape carriage 136 is moved in a linear direction along longitudinal axis B-B with the cabinet by means of the motorized linear actuator 140.

A programmable logic control is triggered by a computer to transmit pulses to the stepper motor 150. The operator enters data into the computer for factors like the length of the knife blade, type of knife blade, serial number of the knife for internal tracking, etc. The stepper motor 150 moves the traveling carriage 156 and therefore the tape carriage 136 a defined distance at a defined speed in response to the pulses emitted by the programmable logic control.

Meanwhile, a guide rail 170 is horizontally mounted to the front face of cabinet portion 74. As tape carriage 136 travels in the left or right direction inside the cabinet operated by the motorized linear actuator 140, guide slider 146 with its C-shaped cross sectional profile engages guide rail 170 which fits inside open-faced interior region 148. In this manner, guide rail 170 and guide slider 146 cooperate to enhance the stability of tape carriage 136 as it travels along longitudinal axis B-B.

The tape carriage 136 should travel along the horizontal longitudinal axis at a speed of about 2-10 sec/inch, preferably about 4 sec/inch. This should ensure that an accurate measurement of the sharpness and smoothness of the knife's cutting edge can be obtained by the edge tester device.

Figure 7:
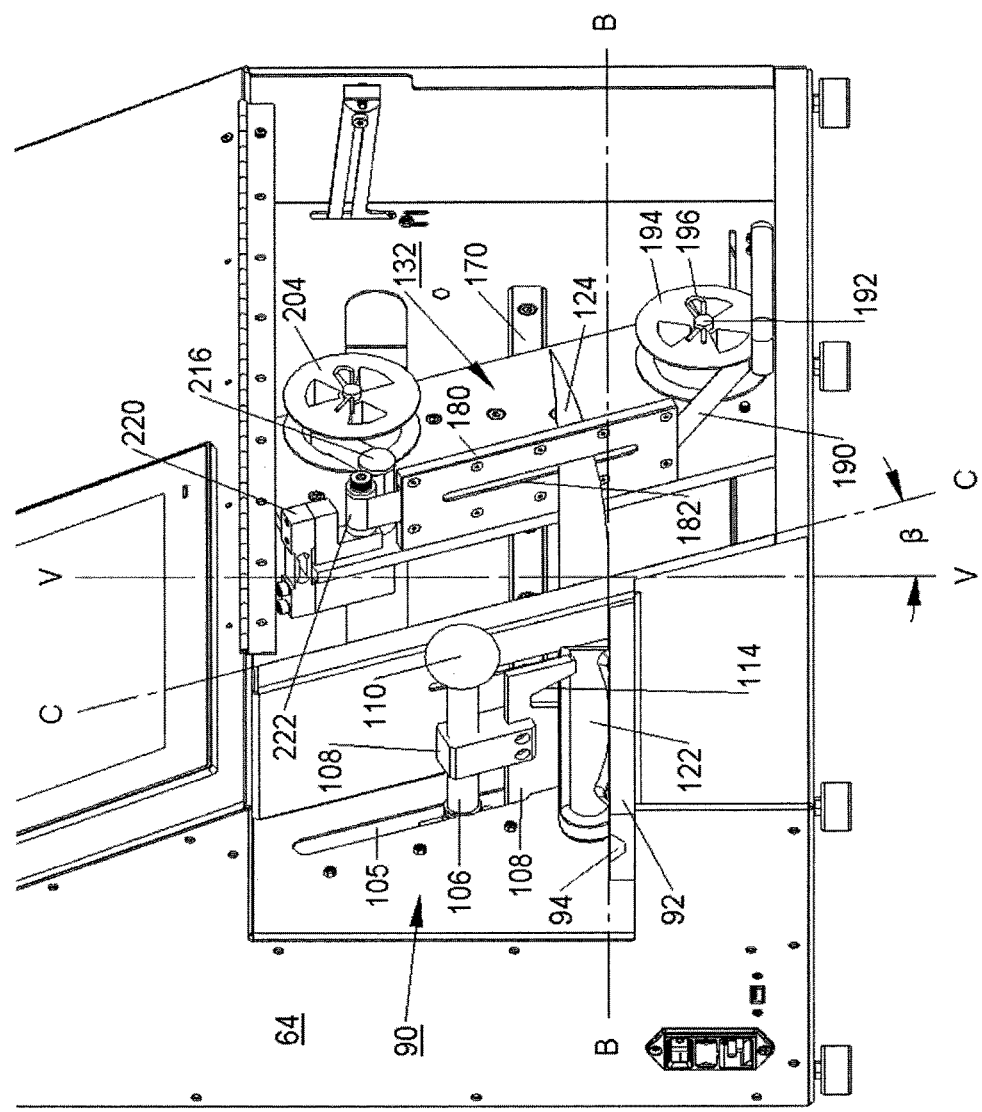
FIG. 7 is an enlarged, partial frontal view of the hand tool securement station and the moving tape carriage of the hand tool edge tester device.
Figure 8:
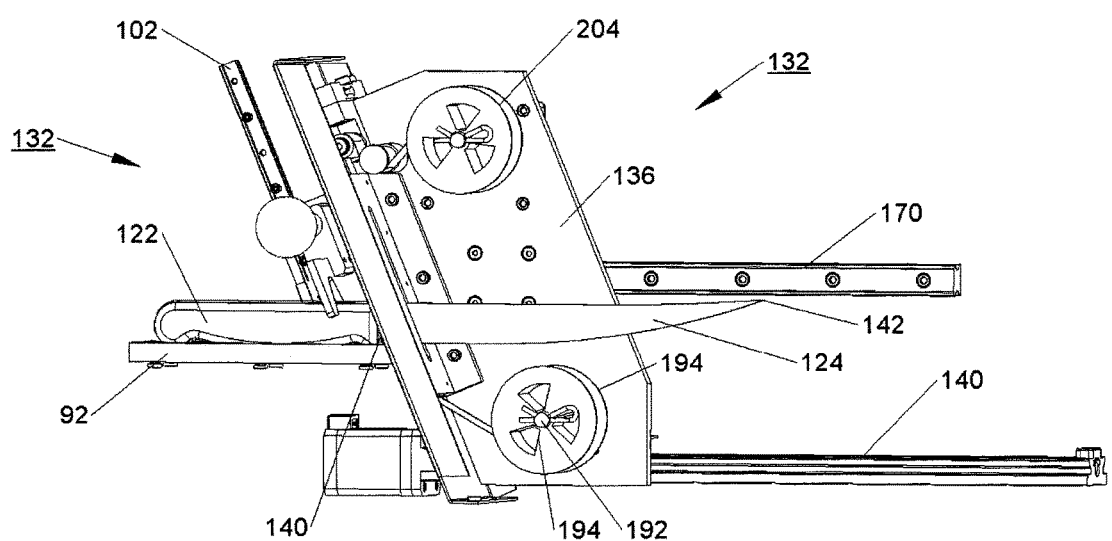
FIG. 8 is a frontal perspective view of the hand tool securement station and moving tape carriage assembly.
Figure 9:
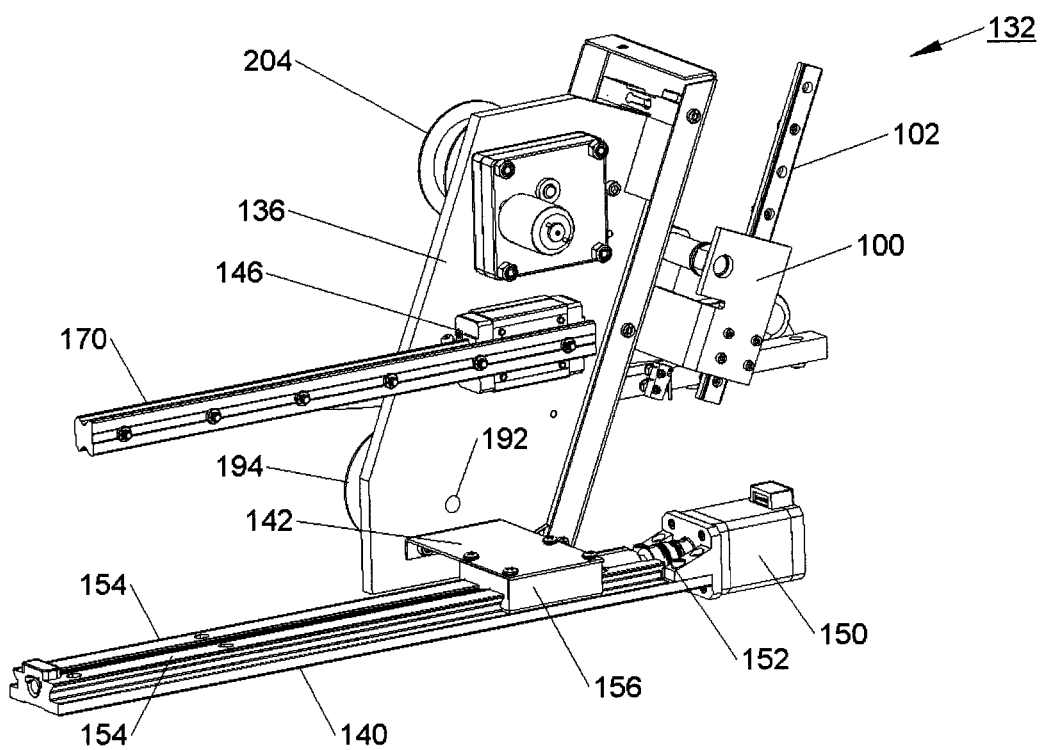
FIG. 9 is a rear perspective view of the hand tool securement station and moving tape carriage assembly.
Figure 10:
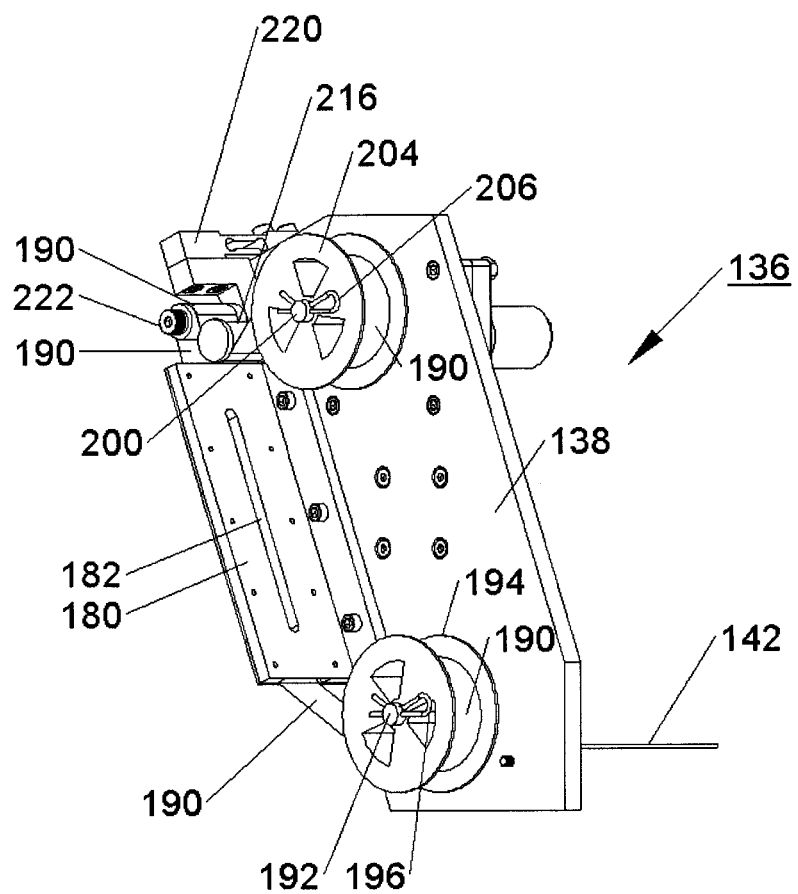
FIG. 10 is a frontal perspective view of the tape carriage assembly.

Extending forwardly from tape carriage member 138 is cutting media guide plate 180. It is made from a metal material like aluminum or stainless steel, or a rigid plastic material like acetal, nylon, acrylonitrile butadiene styrene ("ABS"), or polyvinylchloride that is resistant to cutting or laceration by a knife blade, while also being food-safe. A vertical slot 182 is formed within cutting media guide plate 180. This slot 182 accommodates knife blade 124 as shown in FIGS. 5 and 7-8. The left side face 184 of cutting media guide plate 180 has a vertical niche 186 formed within its surface for accommodating the cuttable substrate tape 190 that will be described below.

Mounted onto the lower region of tape carriage member 138 and extending in a forward direction is a stationary post 192. Idler tape reel 194 engages this post 192 and can freely be rotated around the post. A cotter pin 196 may be used to secure idler tape reel 194 onto the post 192.

A rotating drive post 200 passes through a hole 202 formed into the upper region of tape carriage member 138. This rotating drive post 200 extends in a forwards direction from the tape carriage member 138. Drive tape reel 204 engages this rotating drive post 200 and is turned by the rotating drive post 200. A cotter pin 206 may be used to secure the drive tape reel 204 onto the rotating drive post 200.

A DC gear motor 210 is attached to rotating post 200. It comprises a motor with gear reduction. If the motor output spins at 500 rpm, the gear reduction reduces the tape spin speed to 4 rpm. This is very slow for a knife edge tester, and improves the accuracy of the load cell measurement which will be described below. Suitable gear motors for the hand tool edge tester may be sourced from Dayton, Inc. or Baldor Motors. The DC gear motor should produce a tape spin speed of about 1-10 rpm, preferably about 4 rpm.

Horizontal oval slot 212 formed in cabinet partition wall 74 allows the DC gear motor housing to extend through the slot into the rear subchamber 78, so that the tape carriage member 138 can freely be moved along the longitudinal axis B-B.

For purposes of the hand tool edge tester 60 of the present invention, cuttable substrate 190 comprises a long piece of solid tape formed from a material that is cuttable by knife blade 124. Suitable materials for this cuttable substrate tape ribbon 190 includes paper or a plastic film like polyamide, polyethylene, polypropylene, nylon, or TEFLON® polytetrafluoroethylene ("PTFE") material, which is a synthetic fluoropolymer of tetrafluoroethylene originally discovered by E.I. DuPont de Nemours, Inc. and currently commercialized by its Chemours Company spin-off company. TEFLON tape is preferred because it has been found to produce accurate cutting force measurements by the load cell without jamming against the knife edge blade. It should be uniform in structure across its surface area without openings or strands such as is the case for mesh materials. The tape ribbon 190 is preferably one inch wide in order to provide an adequate target for the knife blade 124 to penetrate and slice. It should also be 0.001-0.050 inches thick, preferably 0.003 inch thick so that the cuttable substrate material provides adequate resistance for a controlled slice by knife blade 124, while not causing the knife blade to bind against the tape.

The cuttable substrate tape is loaded onto idler tape reel 194. It passes along vertical niche 186 formed within the back side surface of tape carriage member 138 and then around drive tape reel 204. A pulley 216 is positioned adjacent to drive tape reel 204 to enhance the stable travel of the cuttable substrate tape 190 as it is wound onto the drive tape reel 204. Unlike many of the prior art knife edge testers, there is no need for the device 60 of the present invention to place extra tension onto the traveling tape.

Mounted to tape carriage member 138 is load cell 220 which is used to measure the force exerted by knife blade 124 upon the traveling cuttable media tape 190. A load cell is a transducer that is used to create an electrical signal whose magnitude is directly proportional to the force being measured. While various load cell types like hydraulic, pneumatic, and strain gauge may be used for purposes of this invention, a strain gauge load cell is preferred and works on the principle that the strain gauge (a planar resistor) deforms when the material of the load cell deforms appropriately. Deformation of the strain gauge changes its electrical resistance by an amount that is proportional to the strain. This change in resistance of the strain gauge provides an electrical value change that is calibrated to the load placed on the load cell.

For purpose of this invention, load cell 220 comprises a beam-style strain gauge load cell. Model No. EBB-2 sourced from Transducer Techniques of Temecula, Calif. may be used. It should preferably comprise four strain gauges in a wheatstone bridge configuration. The gauges themselves are bonded onto a beam or structural member that deforms when weight is applied. Two of the gauges are in tension and are represented as $T_1$, and $T_2$. The other two gauges are in compression and are represented as $C_1$ and $C_2$, and are wired with compensation adjugments.

As the cuttable substrate tape 190 is moved in an upwards direction T by drive tape reel 204, a force will be exerted against the tape ribbon by means of stationary knife blade 124 that penetrates and slices the moving tape. This force applied by the knife blade causes weight to be applied against load cell 222 around which cuttable substrate tape 190 winds. In the process, gauges $C_1$, and $C_2$ compress, thereby decreasing their resistance. Simultaneously, gauges $T_1$, and $T_2$ are stretched, thereby increasing their resistances. The change in resistances causes more electrical current to flow through $C_1$ and $C_2$ and less current to flow through $T_1$, and $T_2$. Thus, a potential difference is felt between the output and signal leads of the load cell. The result is an output measurement for the relative sharpness of the particular point along the knife blade's cutting edge that is engaging the moving cuttable substrate tape 190 at that particular point in time.

The average force applied to cuttable substrate tape 190 by the stationary knife blade should be zero force when the tape is at rest, and reading greater than zero when the tape is traveling along the flat surface of cutting media guide plate 180, and is being sliced by knife blade 124 which extends through slot 182 to slice the moving tape.

A unique aspect of the hand tool edge tester device 60 of the present invention is that the cutting media guide plate 180 that defines the orientation of the cuttable substrate tape 190 during the slicing and load cell force measurement process is positioned at an angle with respect to the horizontally positioned knife blade 124. In other devices known within the prior art, the substrate is positioned along a vertical plane that is perpendicular to the horizontal knife blade The diagonal axis C-C of the cutting media guide plate 180 instead intersects a vertical axis V-V at an angle ß (see FIG. 7). This angle ß should be about 0-40°, preferably 10-30°, more preferably 22.5°. It has been found that such a diagonal axis for the cutting media guide plate 180, and therefore the path of the traveling cuttable media tape 190, allows the knife blade 124 to cut the tape more easily without tearing compared with a vertically-disposed tape travel. Moreover, knife blades typically curve upwardly as you approach the tip. The diagonal axis of travel for the cuttable substrate tape 190 along diagonal axis C-C provides approximately a 90° angle between the blade tip and the cutting media guide plate, thereby providing a more accurate measurement by load cell 220 of the tip portion of the knife blade as it slices the tape.

A computer control 230 is associated with the hand tool edge tester 60. It will control a number of aspects of the operation of the hand tool edge tester, including the horizontal movement of the tape carriage 136 along longitudinal axis B-B, due to operation of the stepper motor 142 in the motorized linear activator 140, the operation of the DC gear motor 210 coupled to the drive shaft 202 for the drive tape reel 204, the associated travel of the cuttable substrate tape 190 along diagonal axis C-C, and the strain gauge load cell 220 that measures the force exerted by the knife blade cutting edge against the traveling tape. A monitor screen 232 mounted to the upper cabinet panel 70 (see FIG. 5) displays the input and output data for the hand tool edge tester 60.

In operation of the hand tool edge tester 60, the operator will insert the knife handle 122 into clamp 98 with the handle secured between the V-shaped groove 94 of support plate 92, the slanted abutment wall 100, and the V-shaped niche 114 of the tightened clamp member 108 (see FIG. 5). The outside (left-hand) surface of cutting media guide plate 180 of the tape carriage 136 will be in its standby position resting against slanted abutment wall 100 of the clamp assembly 98, as shown in FIG. 8. In this position, knife blade 124 extends through slot 182 in cutting media guide plate 180 and the portion of cuttable substrate tape 90 that lies along the flat surface of the cutting media guide plate. The computer control 230 then simultaneously turns on the stepper motor 142 in motorized linear actuator 140 that operates the tape carriage 136, and the DC gear motor 210 that operates the drive shaft 202 for drive tape reel 204. The motorized linear actuator will cause the tape carriage 136 to travel to the right along longitudinal axis B-B so that the cuttable substrate tape 190 travels along the exposed knife blade cutting edge 124 from the heel 140 of the knife blade to its tip 142. At the same time, the drive tape reel 204 is rotated by drive shaft 200 to wind the cuttable substrate tape 190 to cause it to travel along the diagonal axis C-C defined by cutting media guide plate 180. In the process, the tape will be sliced along its traveling length by knife blade 124 and along the length of the knife blade from its heel 140 to its tip 142. The strain gauge load cell 220 electronics will take a pre-determined sampling of data every second to measure the force exerted by the traveling tape 190 against each point along the knife blade cutting edge as the tape travels along the cutting edge surface. When the force measured by the strain gauge load cell 220 measures zero at the tip point 242 of the knife blade 124, the program stops recording force values from the load cell. The computer control turns off the stepper motor 142 of the motorized linear actuator 140 for the tape carriage 136, and the DC gear motor 210 of the drive shaft 200 for the drive tape reel 204 of the tape carriage 136 to signal to the operator that the test has ended.

Figure 12:
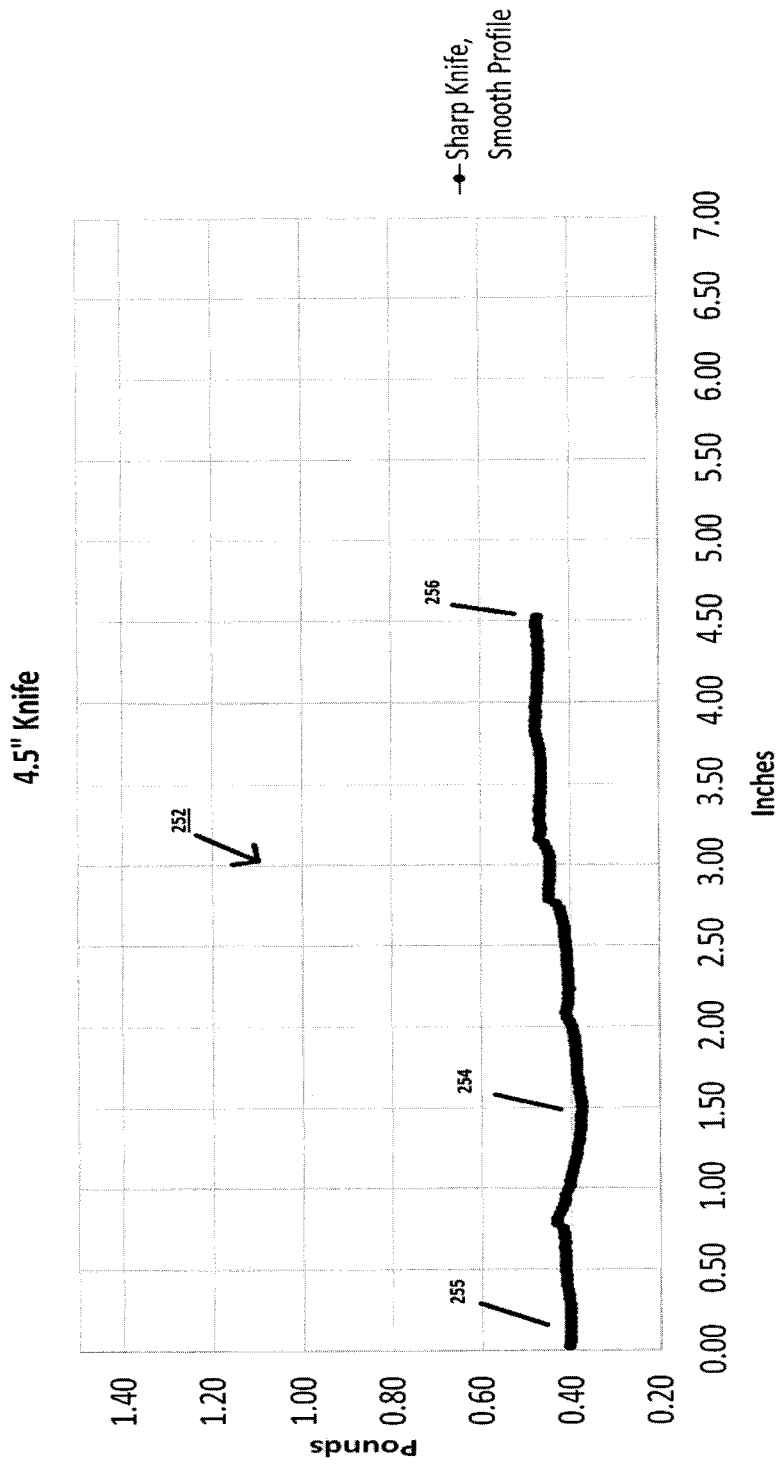
FIG. 12 is a graphical depiction of the force values measured by the load cell along the length of a knife blade cutting edge in a sharp and smooth state as it slices a cuttable substrate moving along the tape carriage assembly.
Figure 13:
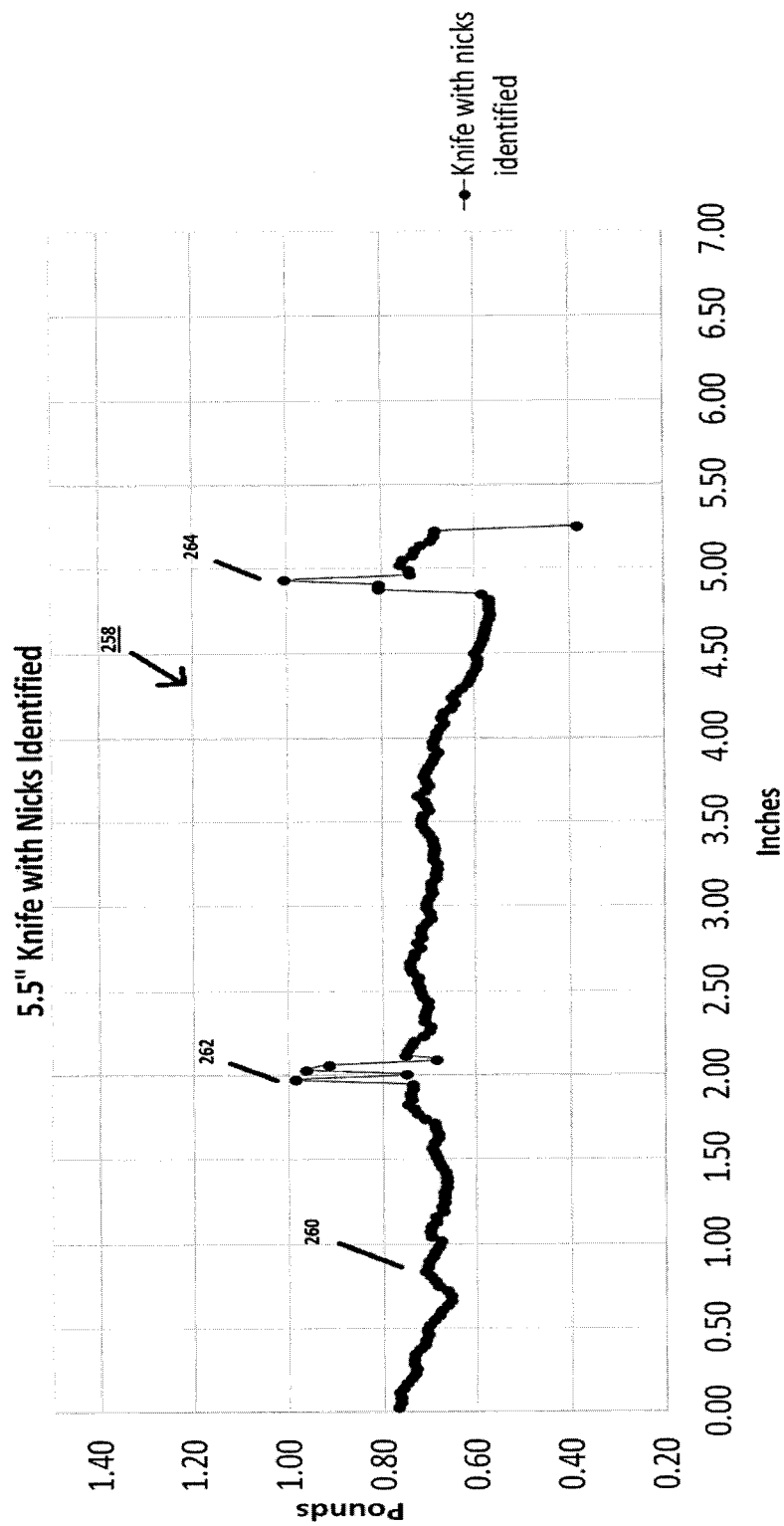
FIG. 13 is a graphical depiction of the force values measured by the load cell along the length of a knife blade cutting edge in a dull and rough state as it slices a cuttable substrate moving along the tape carriage assembly.
Figure 5:
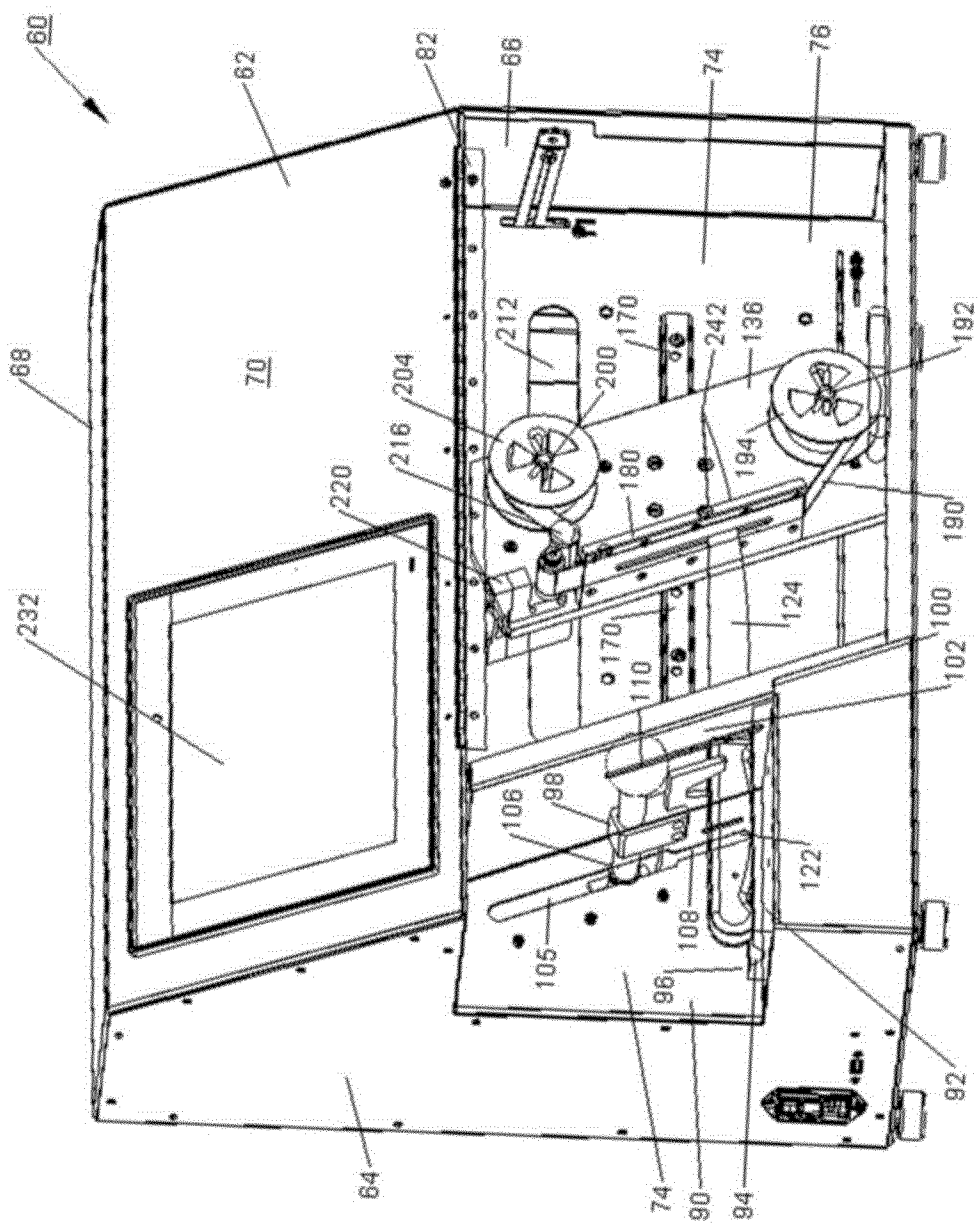
Figure 6:
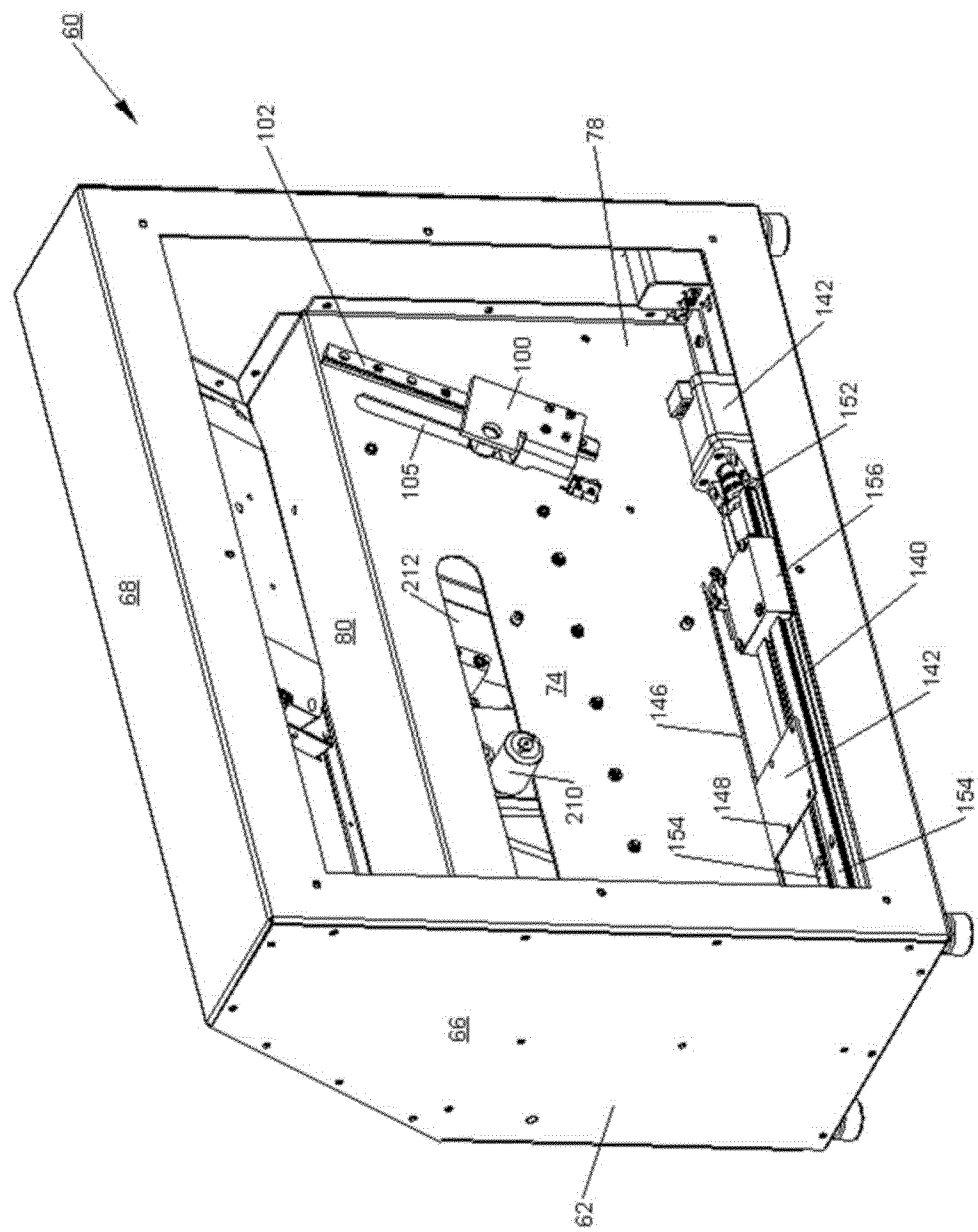
Figure 7:
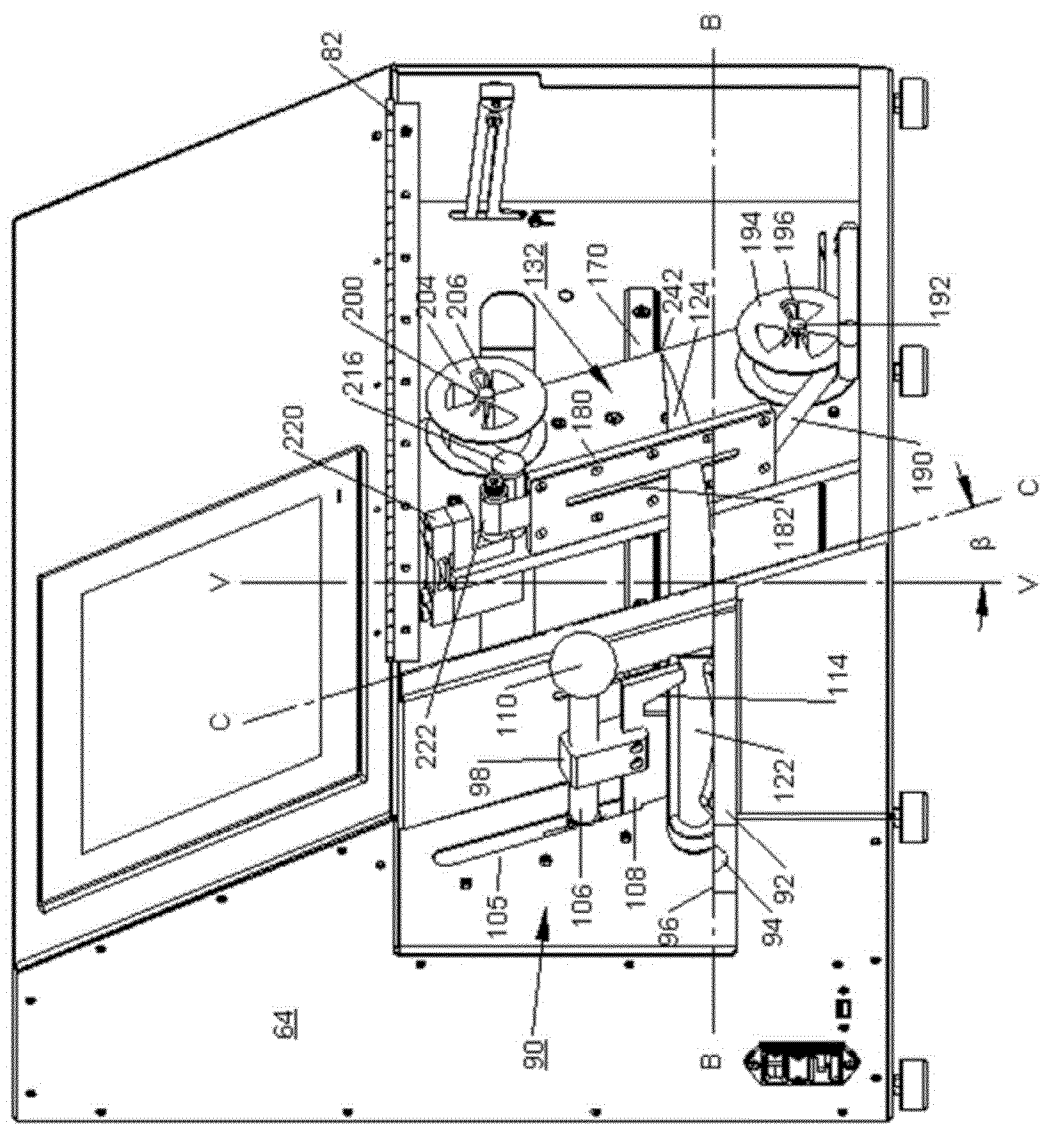
Figure 8:
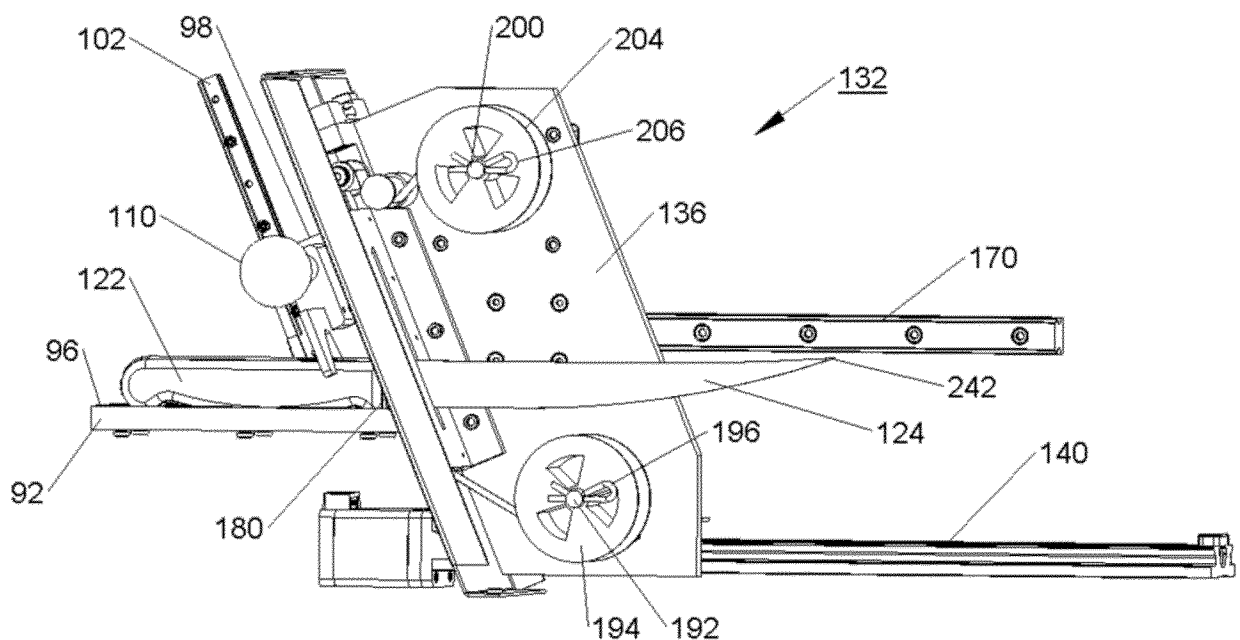

The output force data measured by the strain gauge load cell 220 define a cutting edge profile for the knife blade along the length of its blade from heel 255 to tip 256. The points along the stationary knife blade cutting edge are displayed on the monitor screen 232. Moreover, they can be plotted on a graph, as shown in FIGS. 12-13. The curve of this graph 250 represents the relative sharpness of the knife blade 124 at each point along its cutting edge. This allows the operator to quickly see whether the knife needs to be sharpened.

The graph 252 shown in FIG. 12 represents the strain gauge load cell results for the evaluation of a 4.5-inch long life blade depicting the cutting force measurements in pounds as a function of the distance along the knife blade. The line 254 of the graph is relatively straight and horizontal, suggesting that the blade's cutting edge is smooth and free of nicks and other irregularities. Moreover, the relatively low 0.40 lbs. value along the knife blade for the cutting force also suggests that the cutting edge is sharp.

Meanwhile, FIG. 13 represents another graph 258 for the evaluation of the cutting edge of a 5.5-inch knife blade. In this case, graphical curve 260 for the cutting force values along the cutting edge lie between 0.60-0.80 pounds, thereby suggesting that this knife blade is relatively dull due to the significantly higher cutting force value. Moreover, the variability in the cutting force values suggests a relatively rough knife blade with nicks around the 2-inch and 5-inch distances measured from the heel of the knife blade, as shown by the spikes 262 and 264 along curve 258. Thus, the strain gauge load cell results for the evaluation of the 5.5-inch knife blade using the hand tool edge tester 60 of the present invention informs the operator that this knife needs to be sharpened with particular attention paid to the 2-inch and 5-inch regions along the cutting edge.

Because different knife blades are likely to produce different cutting forces along their blade, a baseline evaluation for the blade in its sharp state should be obtained by means of the hand tool edge tester 60. Subsequent sets of cutting forces measured by the edge tester device along the same or similar knife blade can be compared against the baseline values to indicate relative sharpness and smoothness.

By holding the knife stationary, and moving the cuttable substrate tape 190 along both the horizontal longitudinal axis B-B of the moving tape carriage 136 and the diagonal axis C-C of the tape traveling against the cutting media guide plate 180, greater control is exerted by the traveling tape against the knife blade. This results in more accurate force measurements by the load cell. Moreover, the Teflon or solid paper material of the cuttable substrate tape 190 can be more reliably sliced by the knife blade along its entire blade length. Every bit of the tape and knife blade is consistently tested. By contrast, the mesh material used by Anago in its knife edge tester produces non-uniform resistance due to the strands and gaps in its paper mesh tape. The Anago device may not measure the sharpness of a knife blade accurately, especially along its tip point. The knife edge tester 60 of the present invention can be used to quickly check the sharpness of a knife blade along its entire blade cutting edge to ensure that knife blades are sharpened when needed to avoid cutting inefficiencies and potential worker injuries, while avoiding unnecessary knife sharpening operations which can reduce processing efficiencies such as in a meat packing operation.

The above specification and associated drawings provide a complete description of the structure and operation of the hand tool edge tester of the present invention. Many alternative embodiments of the invention can be made without departing from the spirit and scope of the invention. Therefore, the invention resides in the claims herein appended.

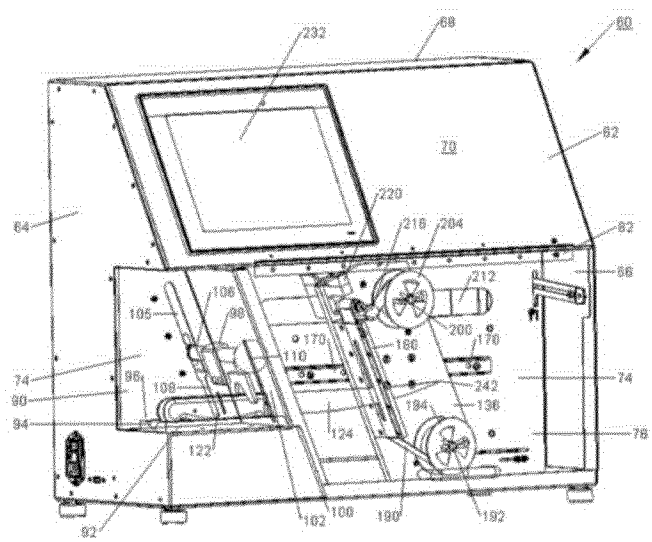

We claim:

1. A hand tool edge tester for evaluating a sharpness and smoothness of the cutting edge of a blade for a hand tool, the hand tool having a handle at its first end and the blade extending from the handle with a tip at its other end, the hand tool edge tester comprising:
   (a) a clamp for securing the handle of the hand tool to position the blade in a stationary orientation along a horizontal longitudinal axis with the cutting edge along the blade pointing downwardly;
   (b) a tape carriage for a cuttable substrate comprising a movable tape ribbon, the tape carriage having means for moving the cuttable substrate along both the horizontal longitudinal axis and a second axis that is upwardly directed;
   (c) a load cell for measuring cutting force;
   (d) wherein the tape carriage is positioned so that the blade pierces the cuttable substrate with the cuttable substrate positioned near the handle of the hand tool;
   (e) wherein the tape carriage is moved along the longitudinal axis and the cuttable substrate moved upwardly along the second axis so that the blade slices the upwardly moving cuttable substrate with the load cell measuring the cutting force exerted by the cuttable substrate against the blade as it is moved along the distance of the cutting edge substantially between the handle and the blade tip; and
   (f) wherein data representing the measured cutting force produces a cutting profile for the cutting edge along the blade to indicate the relative sharpness and smoothness of the cutting edge.

2. The hand tool edge tester of claim 1, wherein the upwardly directed second axis is diagonally disposed.

3. The hand tool edge tester of claim 2, wherein the diagonally disposed second axis intersects a vertical axis at an angle between about 10-30°.

4. The hand tool edge tester of claim 1, wherein the load cell comprises a strain gauge load cell.

5. The hand tool edge tester of claim 1, wherein the tape carriage is moved along a horizontal rail by means of a motorized linear actuator operated by a stepper motor.

6. The hand tool edge tester of claim 1 further comprising a horizontally disposed guide rail engaged by a guide slider mounted to the tape carriage to increase the stability of the horizontal movement of the tape carriage.

7. The hand tool edge tester of claim 1 further comprising a drive tape reel and an idle tape reel rotationally mounted to the tape carriage, the cuttable substrate being loaded onto the idle tape reel with its lead end secured to the drive tape reel so that rotation of the drive tape reel moves the cuttable substrate in an upwards direction along the second axis.

8. The hand tool edge tester of claim 1 further comprising a cutting media guide plate extending from the tape carriage wherein the cuttable substrate moves along a surface of the cutting media guide plate to improve the stability of the movement of the cuttable substrate along the second axis.

9. The hand tool edge tester of claim 1, wherein the cuttable substrate tape ribbon comprises a uniform material along its surface area.

10. The hand tool edge tester of claim of claim 9, wherein the uniform cuttable substrate is formed from paper or a polyamide, polyethylene, polypropylene, nylon, or TEFLON® polytetrafluoroethylene film.

11. The hand tool edge tester of claim 1, wherein the hand tool comprises a domestic, industrial, sport, or hobby instrument worked by hand or within an automated process, such as a knife, cutting blades used on automated cutting or slicing machines, scissors, scalpel, spreading device, prying device, chipping or cutting device, or stripping device.

12. The hand tool edge tester of claim 1, wherein the hand tool comprises a knife used as a dining utensils or in food preparation like a bread knife, boning knife, carving knife, chef's knife, cleaver, butcher's knife, electric knife, kitchen knife, oyster knife, paring or coring knife, rocker knife, steak knife, table knife, or ulu; knives used as tools like a Bowie knife, cobbler's or shoemaker's knife, crooked knife, wood carving knife, diver's knife, electrician's knife, hunting knife, linoleum knife, machete, palette knife, paper knife or letter opener, pocket knife, produce knife, rigging knife, scalpel, straight razor, survival knife, switchblade, utility knife, whittling knife, x-acto knife, balisong, or kiridashi; knives used as weapons like a ballistic knife, bayonet, combat knife, dagger, fighting knife, ramuri, shiv, trench knife, butterfly knife, or throwing knife; or knives used in religious ceremonies like an athame, kirpen, kilaya, kris, kukri, puukko, seax, or sgiandubh.

13. A hand tool edge tester for evaluating a sharpness and smoothness of the cutting edge of a blade for a hand tool, the hand tool having a handle at its first end and the blade extending from the handle with a tip at its other end, the hand tool edge tester comprising:
  (a) a clamp for securing the handle of the hand tool to position the blade in a stationary orientation along a horizontal longitudinal axis with a cutting edge along the blade pointing downwardly;
  (b) a tape carriage comprising a drive tape reel and an idle tape reel rotationally mounted thereto, a cuttable substrate comprising a movable tape ribbon having a lead end, the cuttable substrate being loaded onto the idle tape reel with its lead end secured to the drive tape reel so that rotation of the drive tape reel moves the cuttable substrate in an upwardly inclined, diagonal direction along a second axis;
  (c) a load cell for measuring cutting force;
  (d) wherein the tape carriage is positioned so that the hand tool blade pierces the cuttable substrate with the cuttable substrate positioned near the handle of the hand tool;
  (e) wherein the tape carriage is moved along the longitudinal axis and the cuttable substrate moved upwardly along the second axis so that the blade slices the upwardly moving cuttable substrate with the load cell measuring the cutting force exerted by the cuttable substrate against the blade as it is moved along the distance of the cutting edge substantially between the handle and the blade tip; and
  (f) wherein data representing the measured cutting force produces a cutting profile for the cutting edge along the blade to indicate the relative sharpness and smoothness of the cutting edge.

14. The hand tool edge tester of claim 13, wherein the diagonally disposed second axis intersects a vertical axis at an angle between about 10-30°.

15. The hand tool edge tester of claim 13, wherein the load cell comprises a strain gauge load cell.

16. The hand tool edge tester of claim 13 further comprising a cutting media guide plate extending from the tape carriage wherein the cuttable substrate moves along a surface of the cutting media guide plate to improve the stability of the movement of the cuttable substrate along the second axis.

17. The hand tool edge tester of claim 13, wherein the cuttable substrate tape ribbon comprises a uniform material along its surface area.

18. The hand tool edge tester of claim of claim 17, wherein the uniform cuttable substrate is formed from paper or a polyamide, polyethylene, polypropylene, nylon, or TEFLON® polytetrafluoroethylene film.

19. The hand tool edge tester of claim 13, wherein the hand tool comprises a domestic, industrial, sport, or hobby instrument worked by hand or within an automated process, such as a knife, cutting blades used on automated cutting or slicing machines, scissors, scalpel, spreading device, prying device, chipping or cutting device, or stripping device.

* * * * *

UNITED STATES PATENT AND TRADEMARK OFFICE
CERTIFICATE OF CORRECTION

PATENT NO. : 11,092,527 B1
APPLICATION NO. : 16/196816
DATED : August 17, 2021
INVENTOR(S) : Mary T. Graves et al.

Page 1 of 6

It is certified that error appears in the above-identified patent and that said Letters Patent is hereby corrected as shown below:

On the Title Page

Delete the Title Page and substitute therefore with the attached Title Page consisting of the corrected illustrative figure(s).

In the Drawings

Please replace FIGS. 5, 6, 7 and 8 with FIGS. 5, 6, 7 and 8 as shown on the attached pages.

In the Specification

Column 8, Lines 31-57, should read:
As used within this Application, "hand tool" means a domestic, industrial, sport, or hobby implement used within a manual or automated process to produce useful work, such as a knife, cutting blades used on automated cutting or slicing machines, scissors, scalpel, spreading device, prying device, chipping or cutting device, or stripping device.
As used within this Application, "knife" means a hand-operated cutting tool with a cutting edge or blade and a handle for cutting or trimming a cut substrate. It can have a fixed blade or a blade that folds or slides into a slot in the handle. It includes, without limitation, except for serrated edges, knives used as dining utensils or in food preparation like a bread knife, boning knife, carving knife, chef's knife, cleaver, butcher's knife, electric knife, kitchen knife, oyster knife, paring or coring knife, rocker knife, steak knife, table knife, or ulu; knives used as tools like a Bowie knife, cobbler's or shoemaker's knife, crooked knife, wood carving knife, diver's knife, electrician's knife, hunting knife, linoleum knife, machete, palette knife, paper knife or letter opener, pocket knife, produce knife, rigging knife, scalpel, straight razor, survival knife, switchblade, utility knife, whittling knife, x-acto knife, balisong, or kiridashi; knives used as weapons like a ballistic knife, bayonet, combat knife, dagger, fighting knife, ramuri, shiv, trench knife, butterfly knife, or throwing knife; or knives used in religious ceremonies like an athame, kirpen, kilaya, kris, kukri, puukko, seax, or sgiandubh.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*

(12) United States Patent
Graves et al.

(10) Patent No.: US 11,092,527 B1
(45) Date of Patent: Aug. 17, 2021

(54) HAND TOOL EDGE TESTER

(71) Applicant: Razor Edge Systems, Inc., Ely, MN (US)

(72) Inventors: Mary T. Graves, Manistique, MI (US); Daniel D. Graves, Manistique, MI (US); Joseph C. Juranitch, Babbitt, MN (US); Scott D. Taylor, San Martin, CA (US)

(73) Assignee: Razor Edge Systems, Inc., Ely, MN (US)

(*) Notice: Subject to any disclaimer, the term of this patent is extended or adjusted under 35 U.S.C. 154(b) by 168 days.

(21) Appl. No.: 16/196,816

(22) Filed: Nov. 20, 2018

(51) Int. Cl.
*G01N 3/58* (2006.01)
*B24D 15/08* (2006.01)

(52) U.S. Cl.
CPC ............ *G01N 3/58* (2013.01); *B24D 15/081* (2013.01)

(58) Field of Classification Search
CPC ...................................... G01N 3/56; G01N 3/58
See application file for complete search history.

(56) References Cited

U.S. PATENT DOCUMENTS

| | | |
|---|---|---|
| 1,780,822 A | 11/1930 | Honda |
| 2,055,125 A | 9/1936 | Floyd |
| 2,472,994 A | 6/1949 | Vars |
| 2,925,730 A | 2/1960 | Casselman |
| 3,827,281 A | 8/1974 | Hamel et al. |
| 3,942,394 A | 3/1976 | Juranitch |
| 4,934,110 A | 6/1990 | Juranitch |

(Continued)

FOREIGN PATENT DOCUMENTS

| | | | |
|---|---|---|---|
| DE | 102017001589 B3 * | 7/2018 | ............... G01N 3/58 |
| WO | 2016/080848 | 5/2016 | |

(Continued)

*Primary Examiner* — Walter L Lindsay, Jr.
*Assistant Examiner* — Andrew V Do
(74) *Attorney, Agent, or Firm* — DeWitt LLP

(57) ABSTRACT

A hand tool edge tester for evaluating the sharpness and smoothness of the cutting edge of a blade for the hand tool like a knife is provided according to the invention. The knife blade is held stationary along a horizontal, longitudinal axis. A long piece of solid tape of the cuttable substrate material like Teflon moved within a reel-to-reel tape mechanism attached to a tape carriage travels simultaneously horizontally as the tape carriage moves along a longitudinal axis, and along an upwardly inclined, diagonal pathway defined by the reel-to-reel mechanism. The blade of the hand tool slices the upwardly, diagonally moving tape ribbon with the load cell measuring the cutting force exerted by the tape ribbon against the blade as it is moved along the distance of the cutting edge substantially between the hand tool handle and the blade tip. The diagonal axis for the path of the traveling cuttable substrate media tape allows the knife blade to cut the tape more easily without tearing, along with an approximate 90° angle between the blade tip and the cutting media pathway, thereby providing a more accurate measurement by the load cell of the tip portion of the blade as it slices the tape. The cutting force data produced by the load cell yields a cutting profile for the cutting edge along the hand tool blade to indicate the relative sharpness and smoothness of the cutting edge.

19 Claims, 11 Drawing Sheets